United States Patent [19]
Ishikawa et al.

[11] Patent Number: 5,901,398
[45] Date of Patent: May 11, 1999

[54] CAR WASHING MACHINE

[75] Inventors: Junzo Ishikawa; Akira Ikari, both of Shiga-ken; Masamoto Ueda, Hikone; Mitsuru Nishimura, Shiga-ken; Katsuya Kitanaka, Yokaichi, all of Japan

[73] Assignee: Daifuku Co., Ltd., Osaka, Japan

[21] Appl. No.: 08/788,515

[22] Filed: Jan. 24, 1997

[30] Foreign Application Priority Data

| | | | |
|---|---|---|---|
| Jan. 26, 1996 | [JP] | Japan | 8-011348 |
| Jul. 19, 1996 | [JP] | Japan | 8-190153 |
| Jul. 19, 1996 | [JP] | Japan | 8-190155 |
| Aug. 20, 1996 | [JP] | Japan | 8-217679 |
| Oct. 8, 1996 | [JP] | Japan | 8-266462 |

[51] Int. Cl.$^6$ .................................................. B60S 3/06
[52] U.S. Cl. ...................... 15/53.3; 15/DIG. 2; 134/123; 104/165; 198/395
[58] Field of Search ..................... 15/53.1, 53.4, 15/97.3, DIG. 2; 134/123; 104/165; 198/395, 780, 781.06

[56] References Cited

U.S. PATENT DOCUMENTS

| | | | |
|---|---|---|---|
| 2,025,780 | 12/1935 | Rosebrook | 15/53.3 |
| 2,110,942 | 3/1938 | Piquerez | 134/123 X |
| 3,037,223 | 6/1962 | Lovsey | 15/97.3 X |
| 3,391,700 | 7/1968 | Lawter | 15/DIG. 2 X |
| 3,772,724 | 11/1973 | Wilson | 15/53.3 |
| 3,867,735 | 2/1975 | Takeuchi | 15/53.3 |
| 3,908,219 | 9/1975 | Chapman et al. | 15/53.3 |
| 5,432,974 | 7/1995 | Yasutake et al. | 15/53.3 X |

FOREIGN PATENT DOCUMENTS 5-193458  8/1993  Japan ................................ 15/DIG. 2

*Primary Examiner*—Mark Spisich
*Attorney, Agent, or Firm*—Reising, Ethington, Barnes, Kisselle, Learman & McCulloch PC

[57] ABSTRACT

According to a conventional continuous car washing machine in which one of the right and left side brushes is stationary, a roller conveyor which transports a vehicle to be washed is provided with wheel guides to maintain a spacing between a lateral surface of the vehicle and one side brush at a given value. Thus, there has been a problem that it is difficult to drive the vehicle to move itself onto the required position on the roller conveyor. The present invention which is intended to solve the problem provides a car washing machine comprising a stationary car washing machine body in which a pair of side brushes (8a, 8b) are disposed to be retractable in the transverse direction at a right angle with the direction of transport of a vehicle in order for washing at least the lateral surfaces of the vehicle (2), and a conveyor device (3) for transporting the vehicle (2) which is free of wheel guides and has a sufficient width to accommodate a plurality of different car widths.

5 Claims, 26 Drawing Sheets

CAR WASHING MACHINE

FIELD OF THE INVENTION

The present invention relates to a car washing machine comprising a conveyor unit for transporting a vehicle to be washed forwardly into a stationary type car washing machine body and rearwardly out of the car washing machine body, said vehicle being washed while it is being moved by said conveyor unit.

BACKGROUND OF THE INVENTION

A known washing machine, for example one shown in U.S. Pat. No. 5,432,974, comprises a tunnel-shaped stationary type car washing machine body installed on a floor and having washing means for washing a vehicle, and a pair of roller conveyors for transporting said vehicle forwardly into said car washing machine body and rearwardly out of said car washing machine body.

An example of said washing means comprises a first side brush which, while being rotated, is moved longitudinally and transversely to wash the front and rear surfaces and one lateral surface of the vehicle, and a fixed type second side brush which is rotated, not moved, to wash the other lateral surface of the vehicle.

Since said second side brush is of the fixed type, it is necessary to maintain the distance between said other lateral surface of the vehicle and the second side brush at a constant value; to this end, the width of the roller conveyor associated with said other lateral surface of the vehicle is set at about the width of the wheels and a guide body for the wheel to guide the wheels associated with the other lateral surface of the vehicle.

According to the above arrangement, with the roller conveyor associated with the other lateral surface of the vehicle serving as a guide, the vehicle is carried onto the roller conveyor, whereupon the vehicle is transported by the roller conveyor into the car washing machine body, and washed by the washing means, such as said side brushes, while being transported by the roller conveyor, until the vehicle is transported out of the car washing machine body.

With the arrangement of said known car washing machine, however, since the width of the roller conveyor on one side is narrowed, there has been a problem that it is hard to drive the vehicle in carrying the latter onto the roller conveyor.

DISCLOSURE OF THE INVENTION

Accordingly, an object of the present invention is to solve said problem and provide a car washing machine so designed that a vehicle to be washed can be easily carried onto the conveyor and that the length of the car washing machine can be shortened.

To achieve this object, the invention provides a car washing machine comprising a tunnel-shaped stationary type car washing machine body installed on the floor and having washing means for washing a vehicle, and a conveyor device for transporting said vehicle forwardly into said car washing machine body and rearwardly out of said car washing machine body, said conveyor device supporting and transporting said vehicle through locked wheels, characterized in that said conveyor device is comprised of a conveyor free of at least a part of wheel guides for guiding the wheels of said vehicle.

DESCRIPTION OF THE PREFERRED EMBODIMENTS

Figure 1:
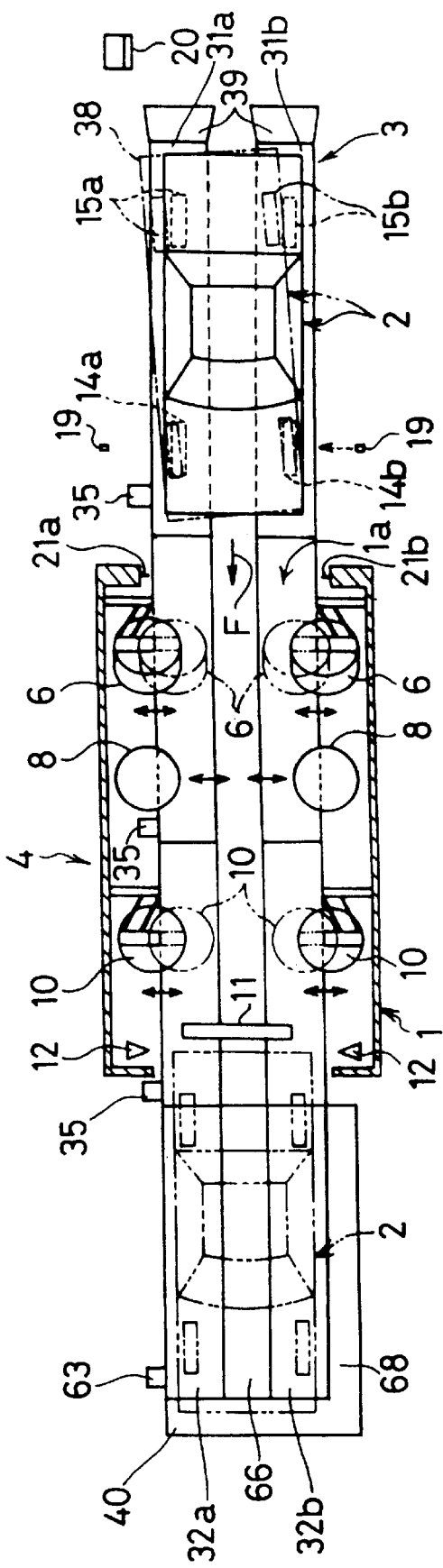
FIG. 1 is a plan view, partly broken away, of a car washing machine according to an embodiment of the invention.
Figure 2:
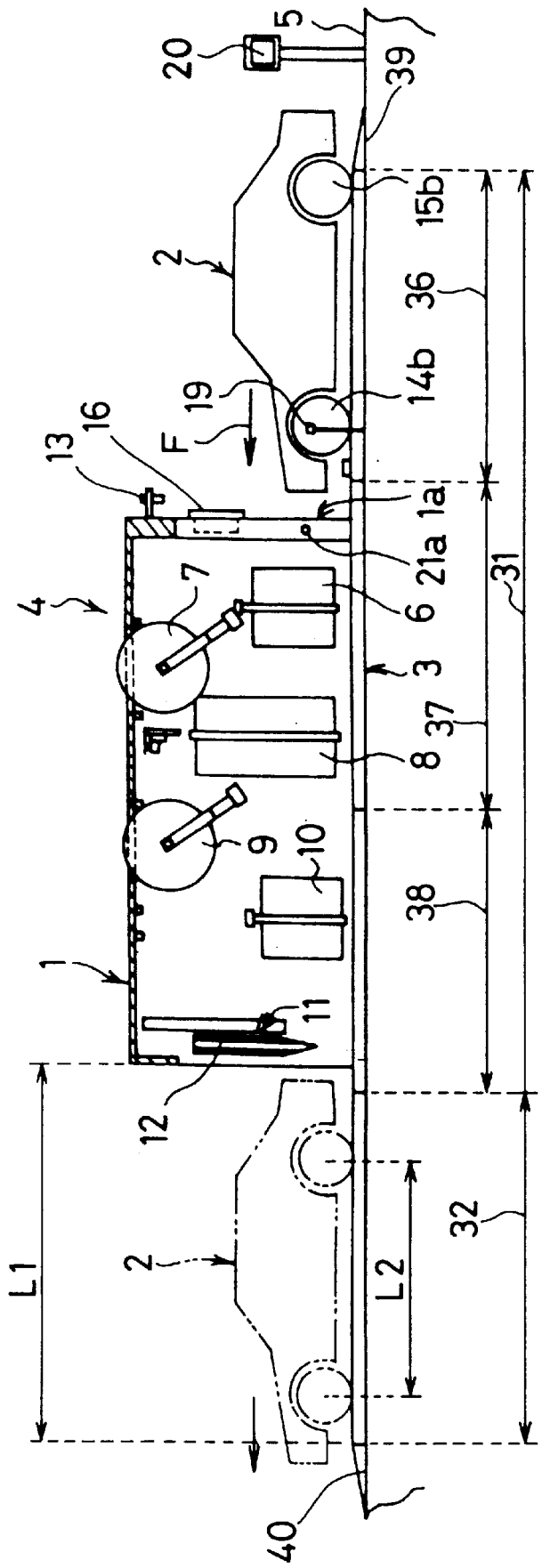
FIG. 2 is a view, partly broken away, of said car washing machine.

As shown in FIGS. 1 and 2, a car washing machine 4 is installed on a floor 5, said car washing machine comprising a stationary type car washing machine body 1, and a conveyor device 3 for transporting a vehicle to be washed 2 forwardly into said car washing machine body 1 and rearwardly out of the car washing machine body 1.

Installed internally of said car washing machine body 1 are, as means for washing the vehicle 2, a pair of washing rocker brush devices 6, a washing top brush device 7, a pair of washing side brush devices 8, a waxing top brush device 9, a pair of waxing rocker brush devices 10, a drying top nozzle device 11, and a pair of drying side nozzle devices 12.

The pair of rocker brush devices 6 which move transversely are used to wash the wheels 14a, 14b, 15a, 15b and opposite lower regions of the vehicle 2. The top brush device 7 which moves vertically is used to wash the upper surface of the vehicle 2. The side brush devices 8 which move transversely are used to wash the opposite lateral surfaces and front and rear surfaces of the vehicle 2 (details will be given later). The top brush device 9 which moves vertically is used to wax the upper surface of the vehicle 2. The two rocker brush devices 10 which move transversely are used to wax the opposite lateral surfaces. The top nozzle 11 which moves vertically is used to dry the upper surface of the vehicle 2. The side nozzle devices 12 which move transversely are used to dry the opposite lateral surfaces of the vehicle 2.

Figure 3:
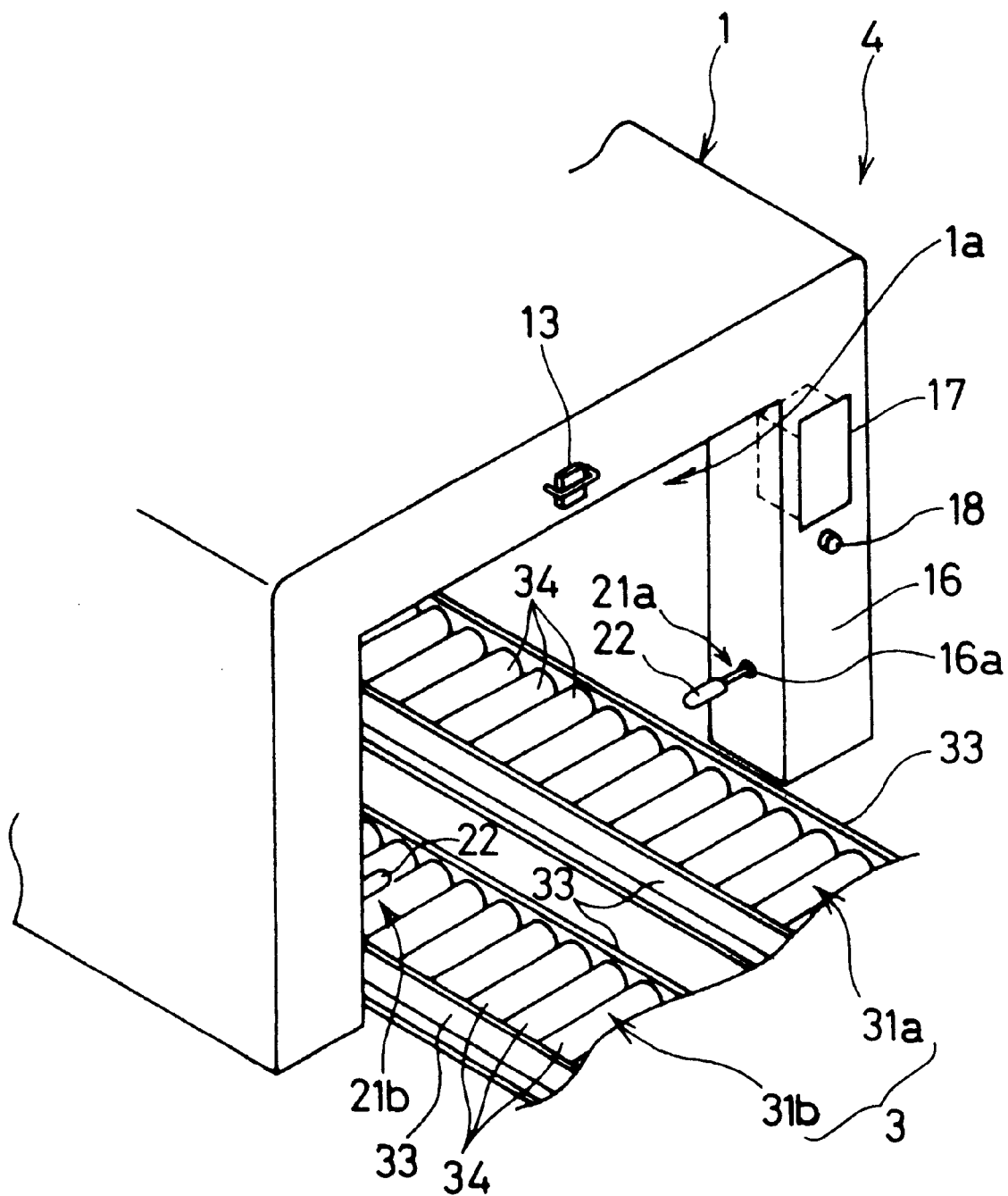
FIG. 3 is a perspective view of the front end of the car washing machine body.

Disposed on top of the front surface of the car washing machine body 1 is a supersonic sensor 13 for detecting the height of the vehicle 2. Disposed at the inlet port 1a of the front end of said car washing machine body 1, as shown in FIG. 3, are a control device 17 comprising a microcomputer and an inverter (details will be given later), and an emergency stop indicator lamp 18. Further, a vehicle detecting device 19 comprising a photoelectric switch for detecting the getting-on of the vehicle 2 is disposed laterally of the start end of the conveyor device 3, while an operation panel 20 is disposed in front of and on one lateral side of the conveyor device 3 so that a driver of the vehicle 2 can select a car washing menu thereby.

<Deviation Detecting Devices>

Figure 4:
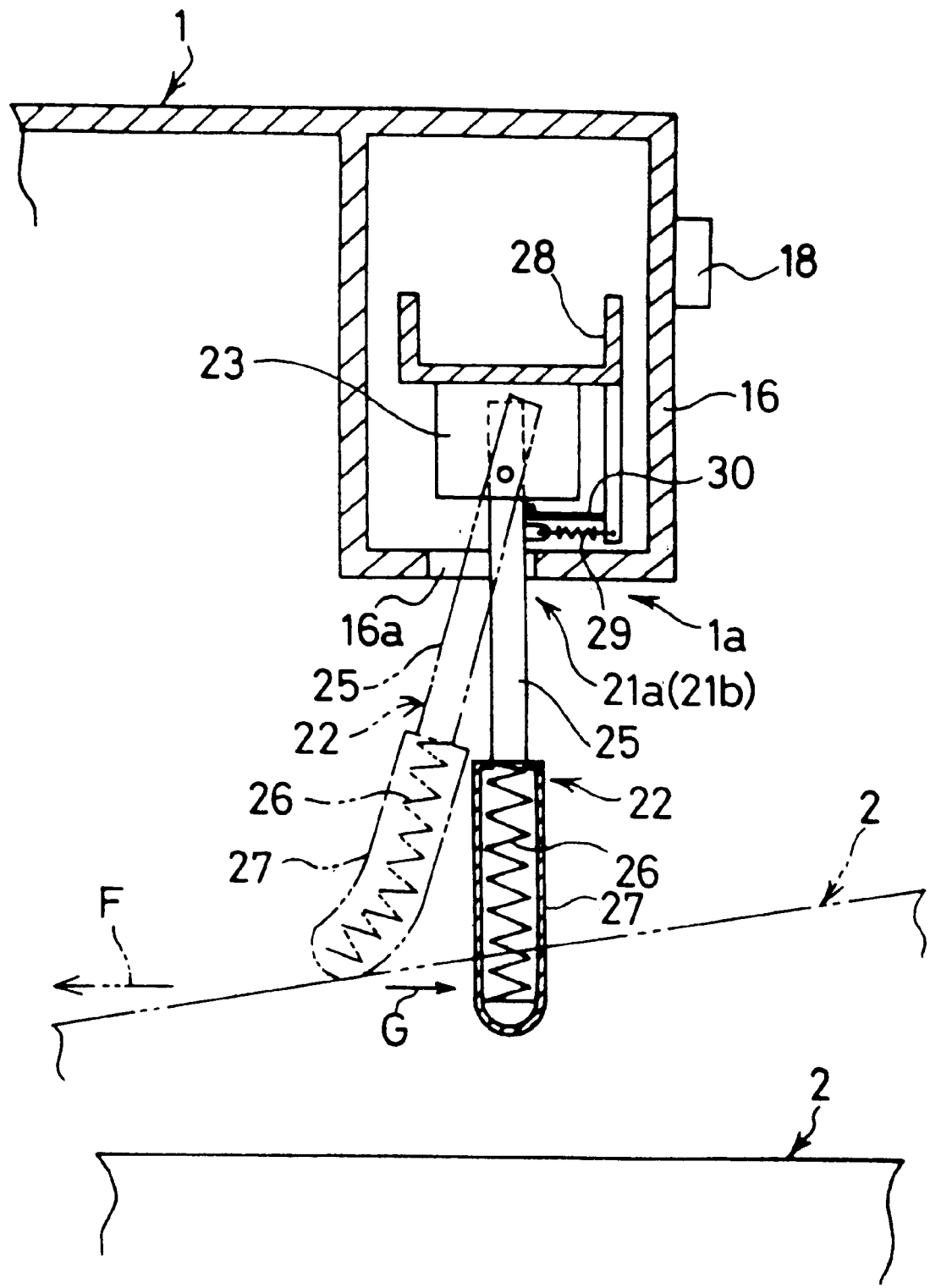
FIG. 4 is a plan view of a deviation detecting device in said car washing machine.

As shown in FIGS. 1 through 3, disposed at the inlet port 1a of the front end of the car washing machine 1 are a pair of deviation detecting devices 21a, 21b for detecting lateral deviation of any part of the vehicle 2 on the conveyor device 3. As shown in FIG. 4, the deviation detecting devices 21a, 21b each comprise a detector 22 which swings transversely in the vehicle transport direction F (rearward) when it comes in contact with a lateral surface of the vehicle 2, and a limit switch 23 for detecting the swing of said detector 22.

Said detector 22 comprises a detecting rod 25 capable of swinging back and forth around the vertical axis, a coil spring 26 attached to the free end of said detecting rod 25, and a bag-like protector cap 27 of rubber fitted on said coil spring 26. Said limit switch 23 is inserted in a wall panel 16 and attached to a frame member 28. Installed on the frame member 28 are an urging spring 29 for urging said detecting rod 25 in the direction G opposite to the vehicle transport direction F, and a stopper 30 for regulating the range of swing of the detecting rod 25 in the opposite direction G. Further, said detector 22 projects out through a hole 16a formed in the wall panel 16.

When the vehicle 2 does not deviate laterally outward of the conveyor device 3 as shown by solid lines in FIG. 1, the vehicle 2, as shown by solid lines in FIG. 4, is transported without contacting the detectors 22 of the deviation detecting devices in the separated state therefrom, so that the limit switches 23 remain in the on-state. However, since the conveyor device 3 is not provided with guides for laterally guiding the wheels 14a, 14b, 15a, 15b, there are times when the vehicle gets on the conveyor device 3 in the laterally biased state, with the rear portion of the vehicle 2 deviating laterally outward the conveyor device 3, as shown by broken lines in FIG. 1. For example, if the vehicle 2 is transported with the rear portion of the vehicle 2 laterally deviated, the lateral surface of the vehicle 2 on the deviated side comes in contact with the end portion of the detector 22 of one of the deviation devices 21a, as shown by a phantom line in FIG. 4, the detector 22 is swung in the vehicle transport direction F against the urging force of the urging spring 29 and the limit switch 23 is changed from the on- to off-state, thereby detecting the deviation of the vehicle 2 out of the conveyor device 3.

<Conveyor Device>

Said conveyor device 3 comprises a pair of conventional main roller conveyors 31a, 31b extending forwardly through the car washing machine body 1 to the rear end of the car washing machine body 1, and a pair of extension roller conveyors 32a, 32b rearwardly continuing from the main roller conveyors 31a, 31b.

The wheels 14a, 15a on one side of the vehicle 2 are supported and transported by one pair of roller conveyors 31a, 32a, while the wheels 14b, 15b on the other side are supported and transported by the other pair of roller conveyors 31b, 32b.

Further, as shown in FIG. 3, said main roller conveyors 31a, 31b are respectively comprised of pair of conveyor frames 33, a plurality of rollers 34 supported to be rotatable between the conveyor frames 33, and a motor (an example of driving device) 35 for driving these rollers 34 to rotate, said main roller conveyors 31a, 31b not being provided with lateral guides.

Further, said one pair of roller conveyors 31a, 32a and the other pair of roller conveyors 31b, 32b are of the same widened width so as to accommodate any car widths of different kinds of vehicles. Further, disposed at the start ends of the main roller conveyors 31a, 31b are front slopes 39 for allowing the vehicle to smoothly get on the conveyor device 3, while rear slopes 40 are disposed at the terminal ends of the extension roller conveyors 32a, 32b for allowing the vehicle 2 to smoothly get off. Said main roller conveyor 31 is longitudinally divided into three parts; a front roller conveyor 36, an intermediate roller conveyor 37, and a rear roller conveyor 38.

<Extension Conveyor>

The arrangement of said extension roller conveyors 32a, 32b will now be described in more detail with reference to FIGS. 5 through 9.

Figure 6:
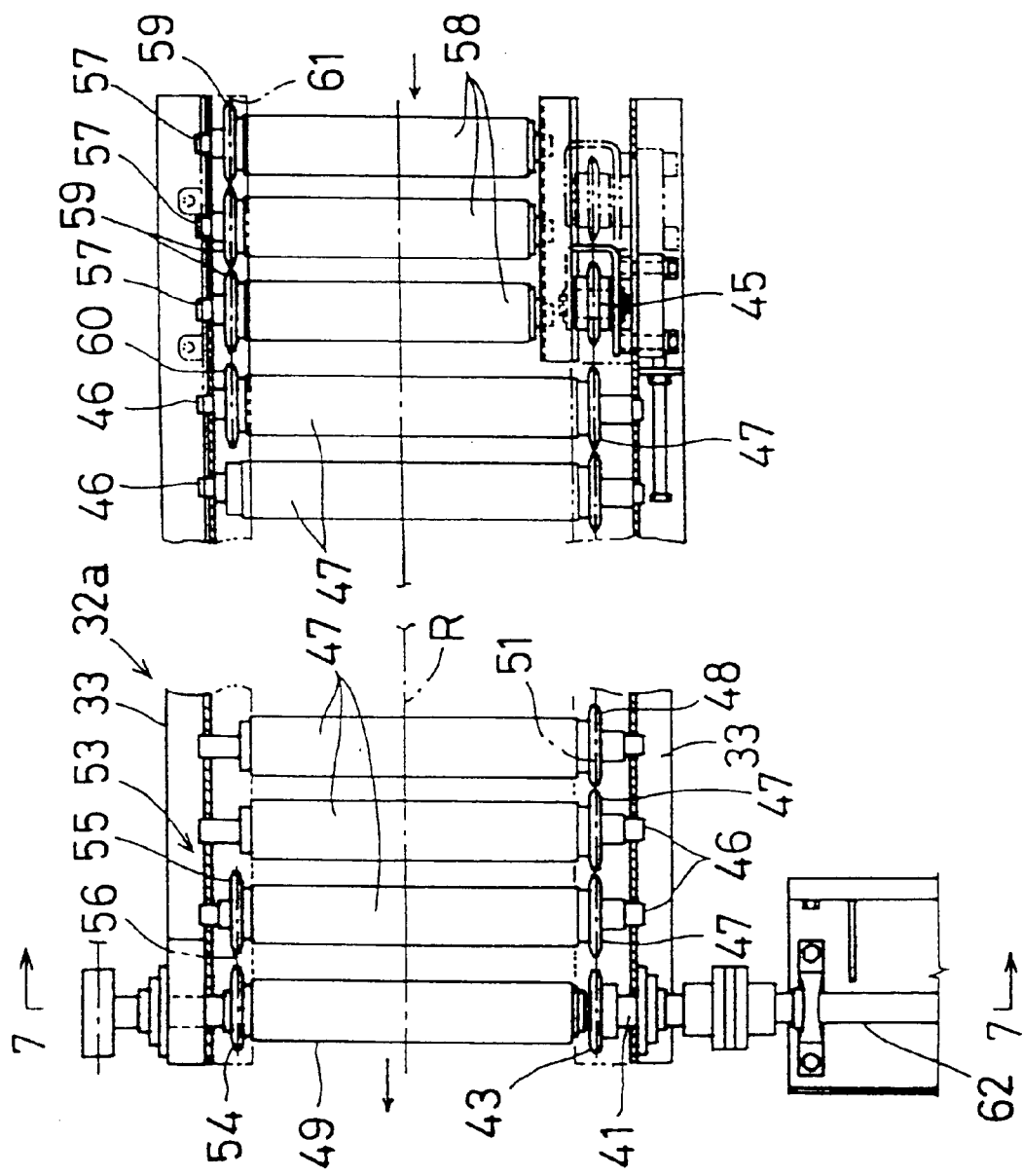
FIG. 6 is an enlarged plan view, partly broken away, of the extension roller conveyor in said car washing machine.
Figure 9:
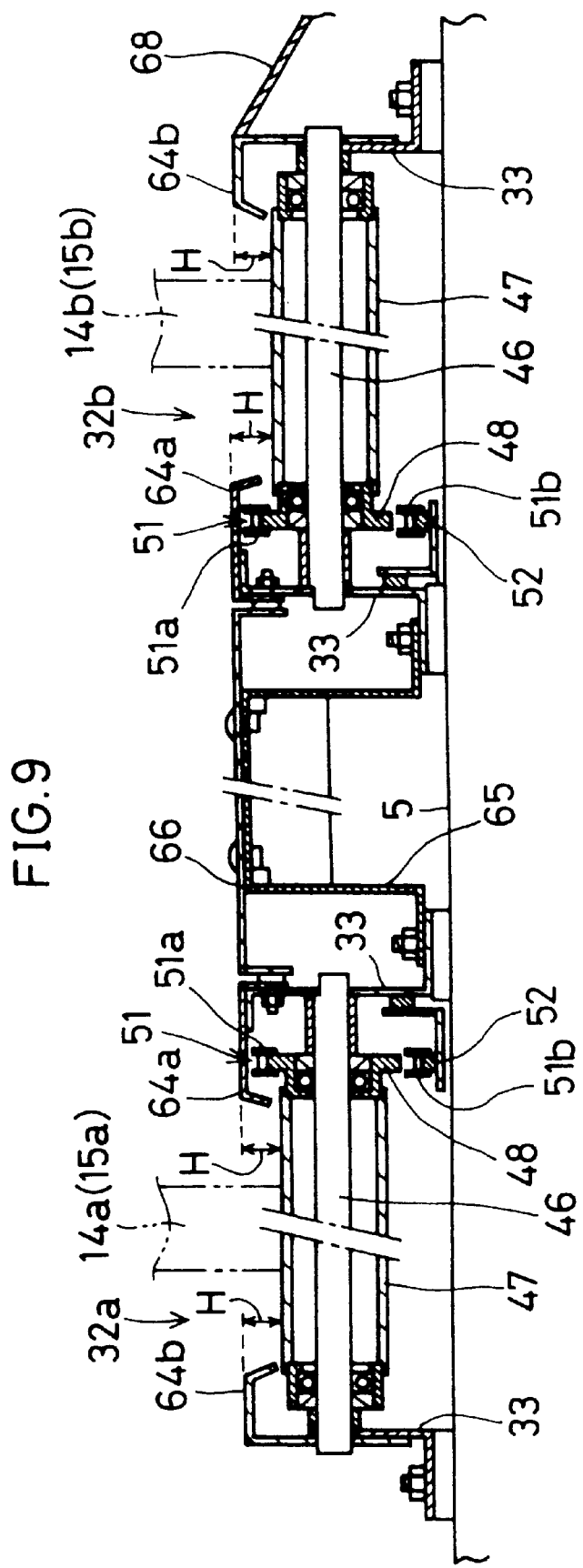
FIG. 9 is a view taken along the line 9—9 in FIG. 5.

The extension roller conveyors 32a, 32b are of the same construction, and a rotary drive shaft 41 is rotatably supported between the rear ends of the pair of conveyor frames 33 through bearings 42, with a driving sprocket 43 integrally rotatably fixed on one end of said rotary drive shaft 41 through a key 44. A freely rotatably driven sprocket 45 is installed at the start end of one conveyor frame 33. Further, as shown in FIGS. 6 and 9, disposed between said conveyor frames 33 are a plurality of rollers 47 freely rotatably supported through a plurality of support shafts 46. Intermediate sprockets 48 are integrally mounted on respective one end of these rollers 47, said intermediate sprockets 48 being interposed between the driving sprocket 43 and the driven sprocket 45. Further, as shown in FIGS. 6 and 7, said rotary drive shaft 41 has an end roller 49 fitted thereon, said end roller 49 and said rotary drive shaft 41 are rotatable independently of each other through bearings 50.

Figure 7:
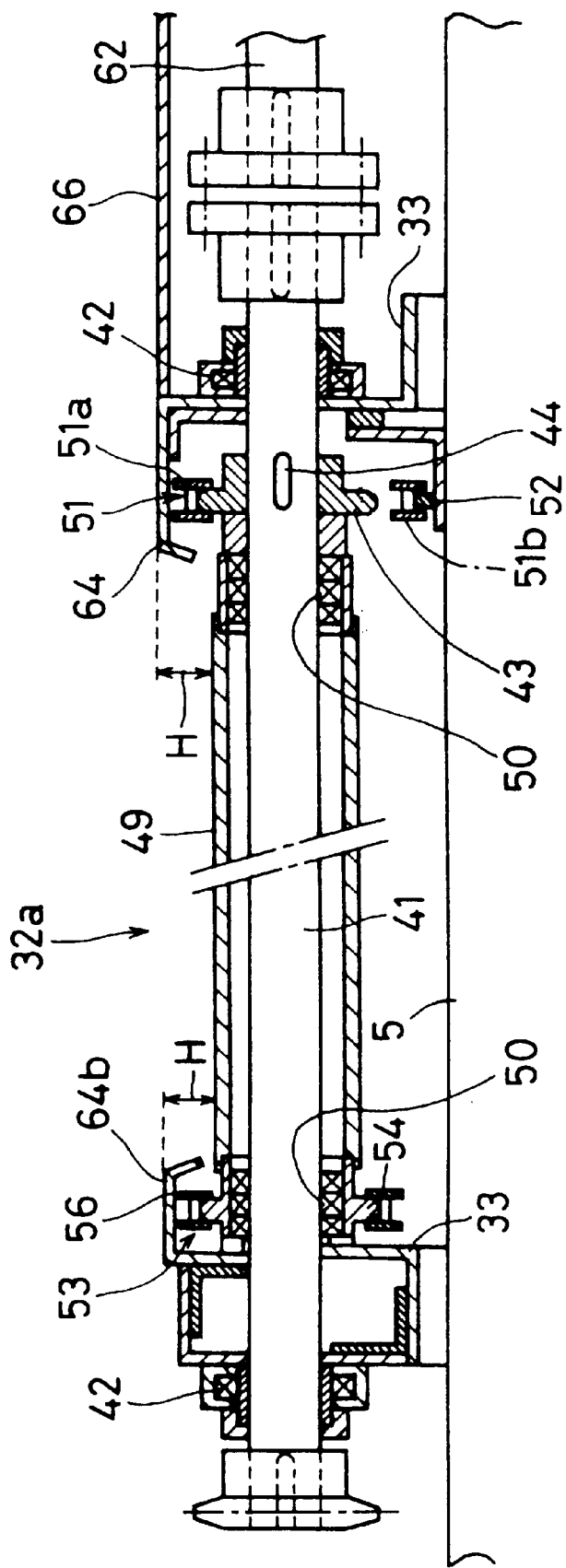
FIG. 7 is a view taken along the line 7—7 in FIG. 6.
Figure 8:
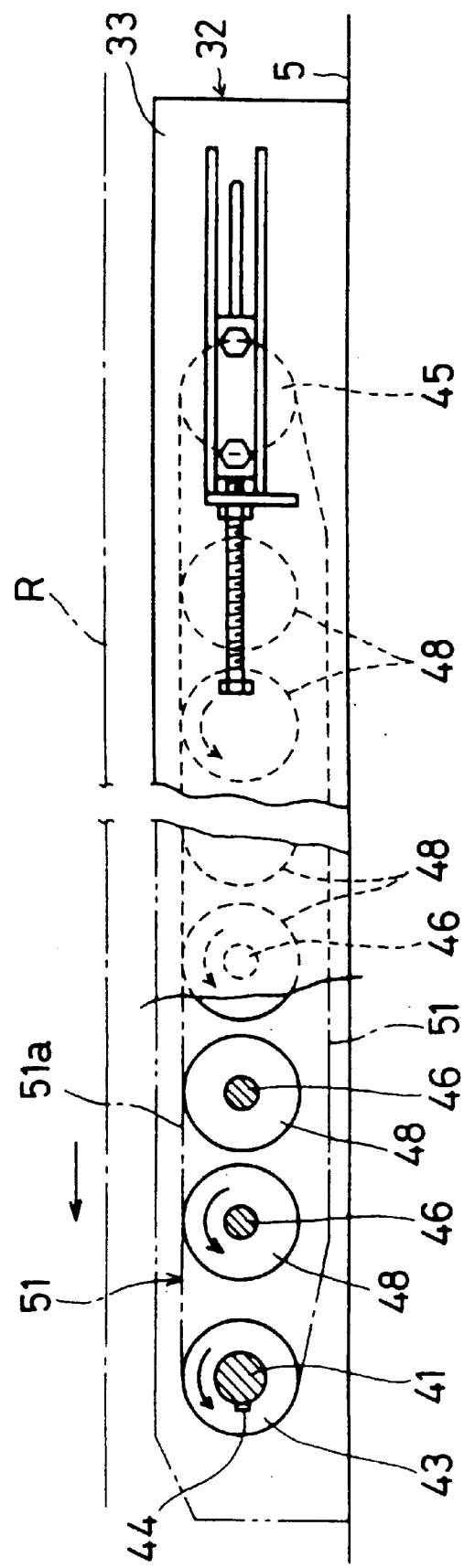
FIG. 8 is a side view, partly broken away, of the extension roller conveyor in said car washing machine.

As shown in FIG. 7, a chain 51 is entrained between said driving and driven sprockets 43 and 45, and upper and lower travel portions 51*a* and 51*b* of said chain 51 are separated from each other by the intermediate sprockets 48. And the upper travel portion 51*a* meshes with the intermediate sprockets 48 from above. Further, as shown in FIG. 9, the lower travel portion 51*b* is supported and guided by a guide rail 52 below the intermediate sprockets 48.

As shown in FIGS. 6 and 7, disposed between the end roller 49 positioned at the terminal ends of said two extension roller conveyors 32*a*, 32*b* and the roller 47 disposed forwardly adjacent said end roller 49 is a transmission device 53 for rotating these rollers 47 and 49 in the same direction. That is, a transmission sprocket 54 is provided at the other end of said end roller 49, and a rotative force supplying sprocket 55 is provided at the other end of the forward adjacent roller 47. An auxiliary chain 56 is entrained between said transmission sprocket 54 and the rotative force supplying sprocket 55.

Figure 5:
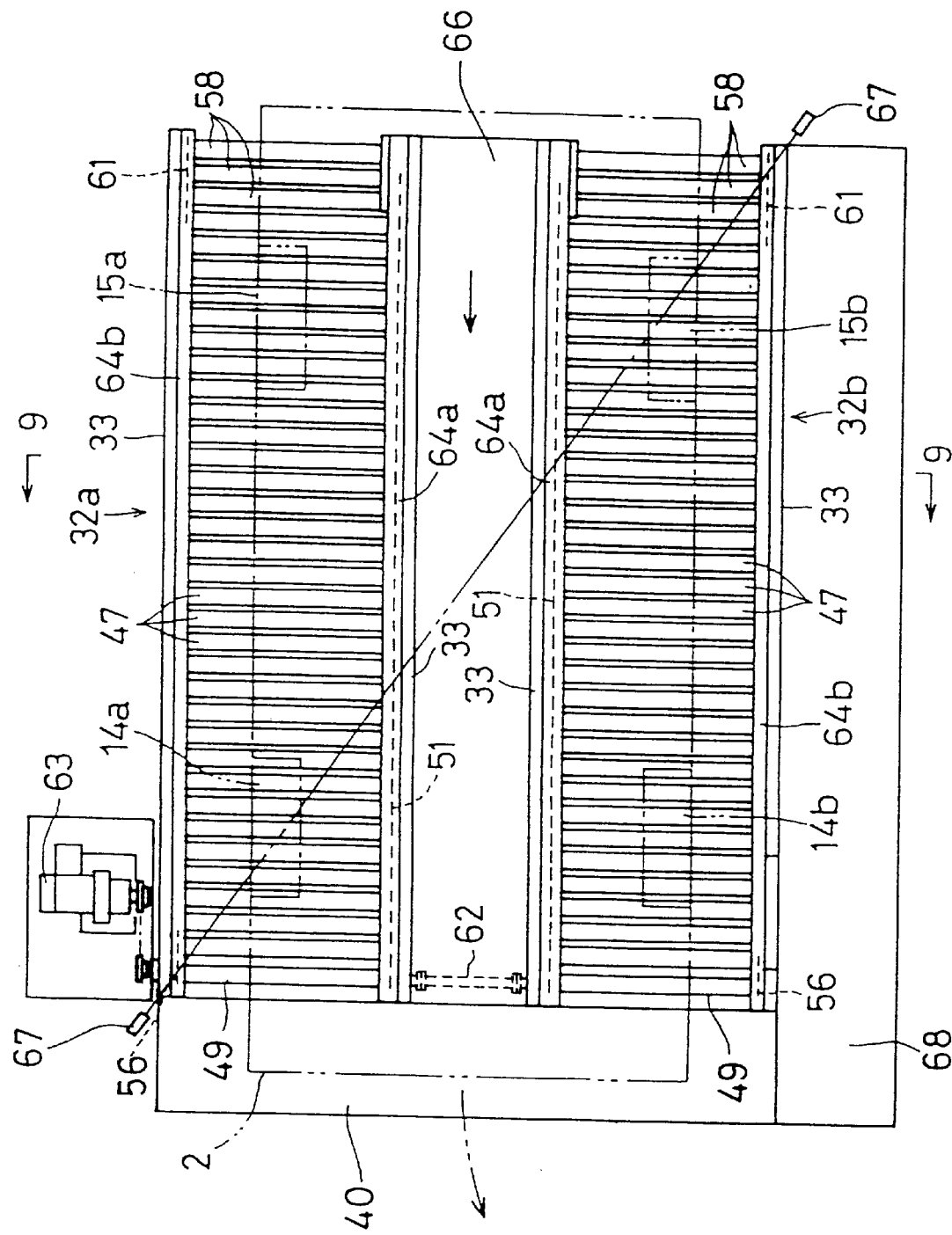
FIG. 5 is a plan view of an extension roller conveyor in said car washing machine.

Further, as shown in FIGS. 5 and 6, disposed at the start ends of said extension roller conveyors 32*a*, 32*b* are a plurality of accessory rollers 58 rotatably supported through support shafts 57. Rotation sprockets 59 are mounted on the other ends of these accessory rollers 58, and a rotative force supplying sprocket 60 is installed at the other end of the roller 47 positioned rearwardly adjacent the accessory rollers 58. And an auxiliary chain 61 is entrained between the rotation sprockets 59 and the rotative force supplying sprocket 60.

As shown in FIGS. 5 through 7, the pair of rotary drive shafts 41 are interconnected by a connecting shaft 62, and one of the rotary drive shafts 41 has a motor 63 (an example of a driving device) operatively connected thereto for driving the drive sprocket 43 through the rotary drive shaft 41. Further, as shown in FIGS. 7 and 9, the conveyor frames 33 are provided with covers 64*a*, 64*b* extending from the start end to the terminal end to prevent the chain 51 and auxiliary chains 56, 61 from contacting the wheels 14*a*, 14*b*, 15*a*, 15*b* of the vehicle 2 being transported. In addition, the height H of said covers 64*a*, 64*b* determined on the basis of the upper ends of the rollers 47, 49, 58 is such that the vehicle 2 can easily climb thereover. Further, as shown in FIG. 9, a cover 66 supported by the frame body 65 installed on the floor 5 extends between the extension roller conveyors 32*a*, 32*b*.

Further, as shown in FIG. 2, the length L1 from the rear end of the car washing machine body 1 to the terminal ends of said extension roller conveyors 32*a*, 32*b* is greater than the wheel base L2 of the longest washable vehicle 2. Further, the extension roller conveyors 32*a*, 32*b* are provided with a vehicle detecting device 67 (such as a photoelectric switch or proximity switch) for detecting the vehicle 2 transported to the terminal ends of the extension roller conveyors 32*a*, 32*b*. Further, disposed outward of one extension roller conveyor 32*b* is a lateral slope continuing from the rear slopes 40 to allow the vehicle 2 to smoothly get off.

Figure 10:
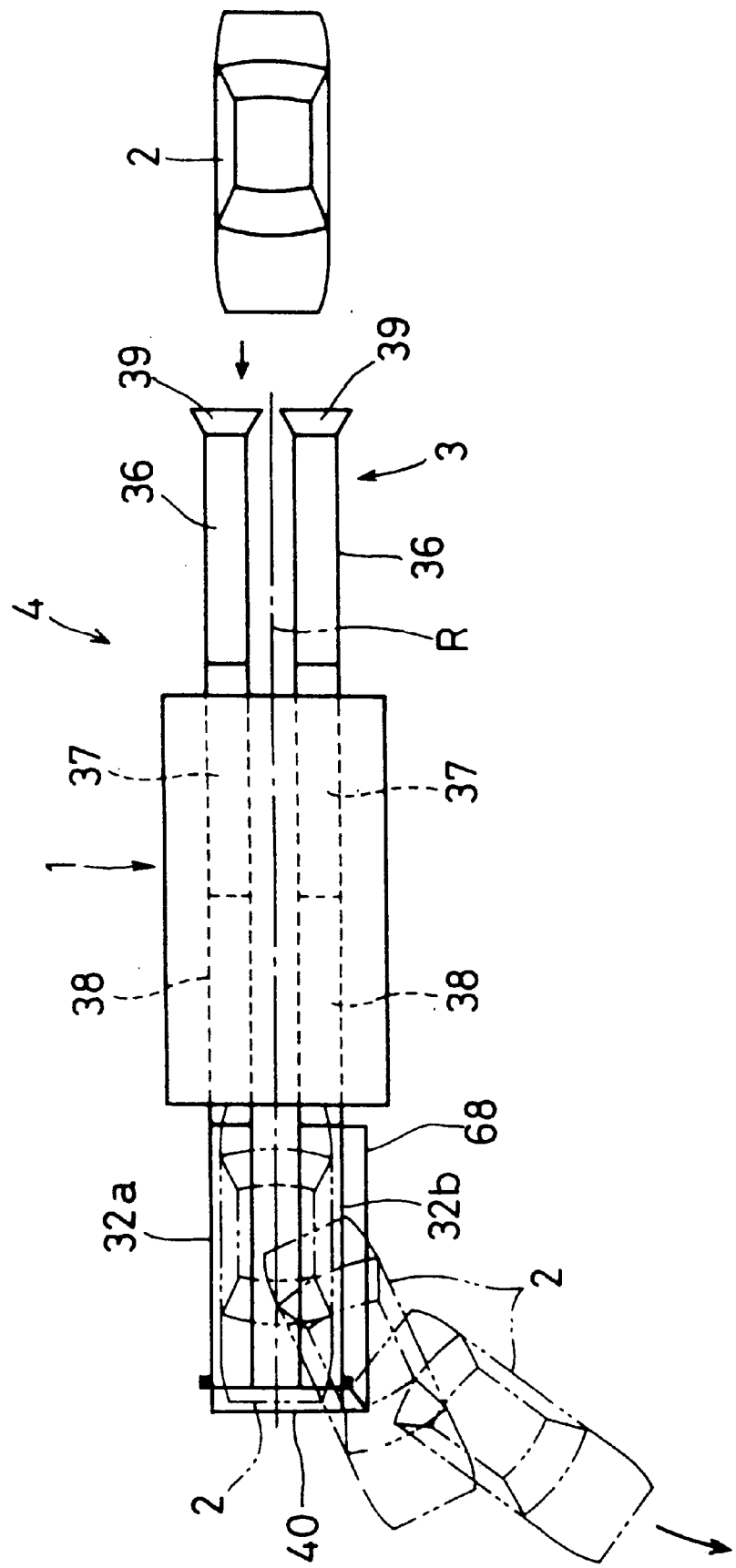
FIG. 10 is a plan view of said car washing machine.

According to such extension roller conveyors 32*a*, 32*b*, the vehicle 2 is transported to the rear ends of the extension roller conveyors 32*a*, 32*b*, whereupon the latter are stopped. In this case, since the length L1 from the terminal end of the car washing machine body 1 to the terminal ends of the extension roller conveyors 32*a*, 32*b* is greater than the wheel base L2 of the vehicle 2, the rear wheels 15*a*, 15*b* of the vehicle 2 are stopped rearward of the car washing machine body 1, and substantially the entire vehicle comes out rearward of the car washing machine body 1. Thereafter, as shown in FIG. 10, a driver drives the vehicle 2 to travel until it leaves the extension roller conveyors 32*a*, 32*b*. Since said cover 64 is low and the cover body 66 and lateral slope 68 are provided, the driver may then turn the steering wheel toward the lateral slope 68, thereby transporting the vehicle 2 laterally out of the extension roller conveyors 32*a*, 32*b*.

Thus, even when the front wheels 14*a*, 14*b* of the vehicle 2 have been locked, substantially the entire vehicle 2 can be reliably transported rearwardly of the car washing machine body 1. Thereafter, the vehicle 2 can be safely and smoothly transported out of the extension roller conveyors 32*a*, 32*b*.

<Side Brushes>

Figure 11:
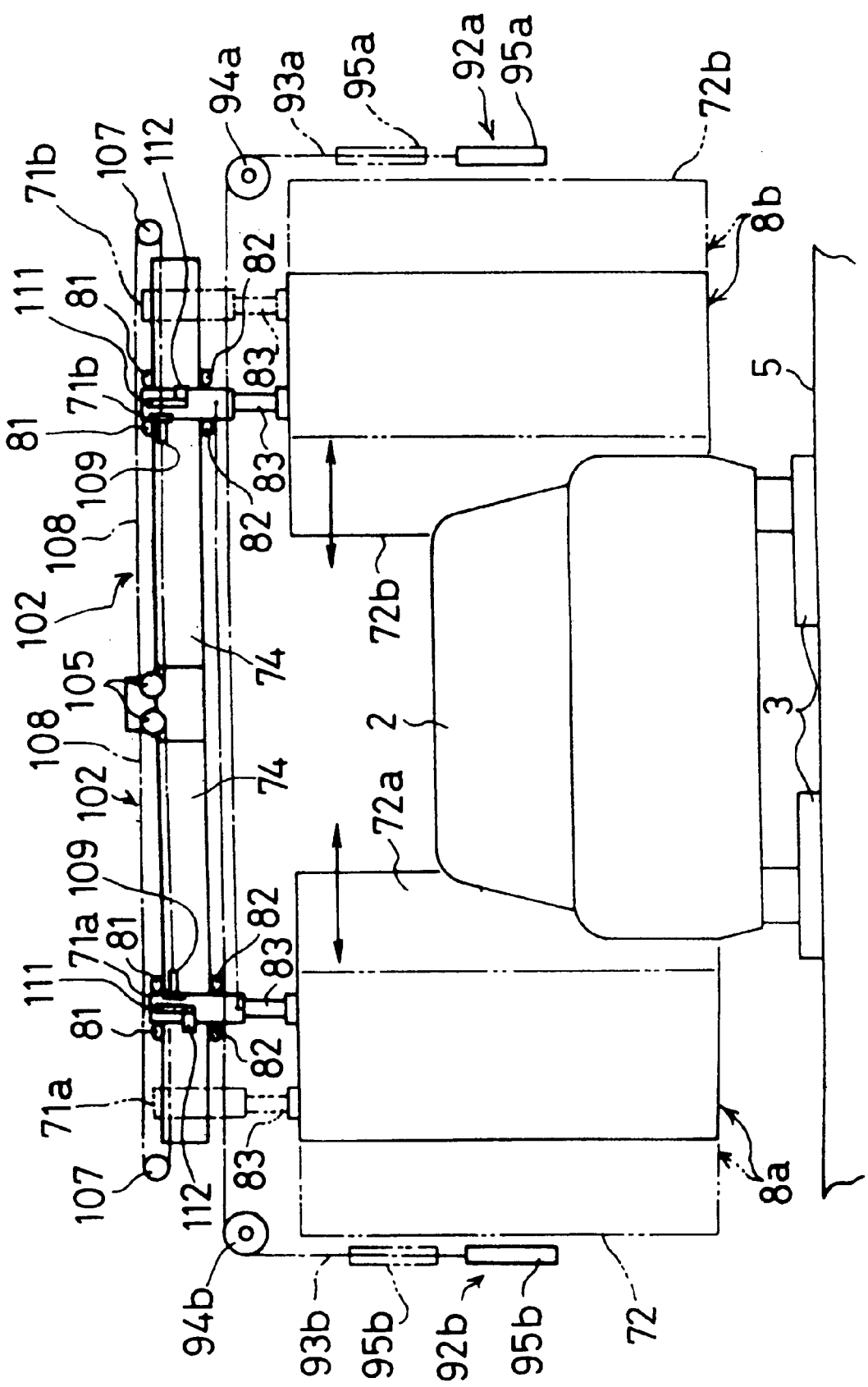
FIG. 11 is a front view for explaining the movement of a side brush device in said car washing machine.
Figure 12:
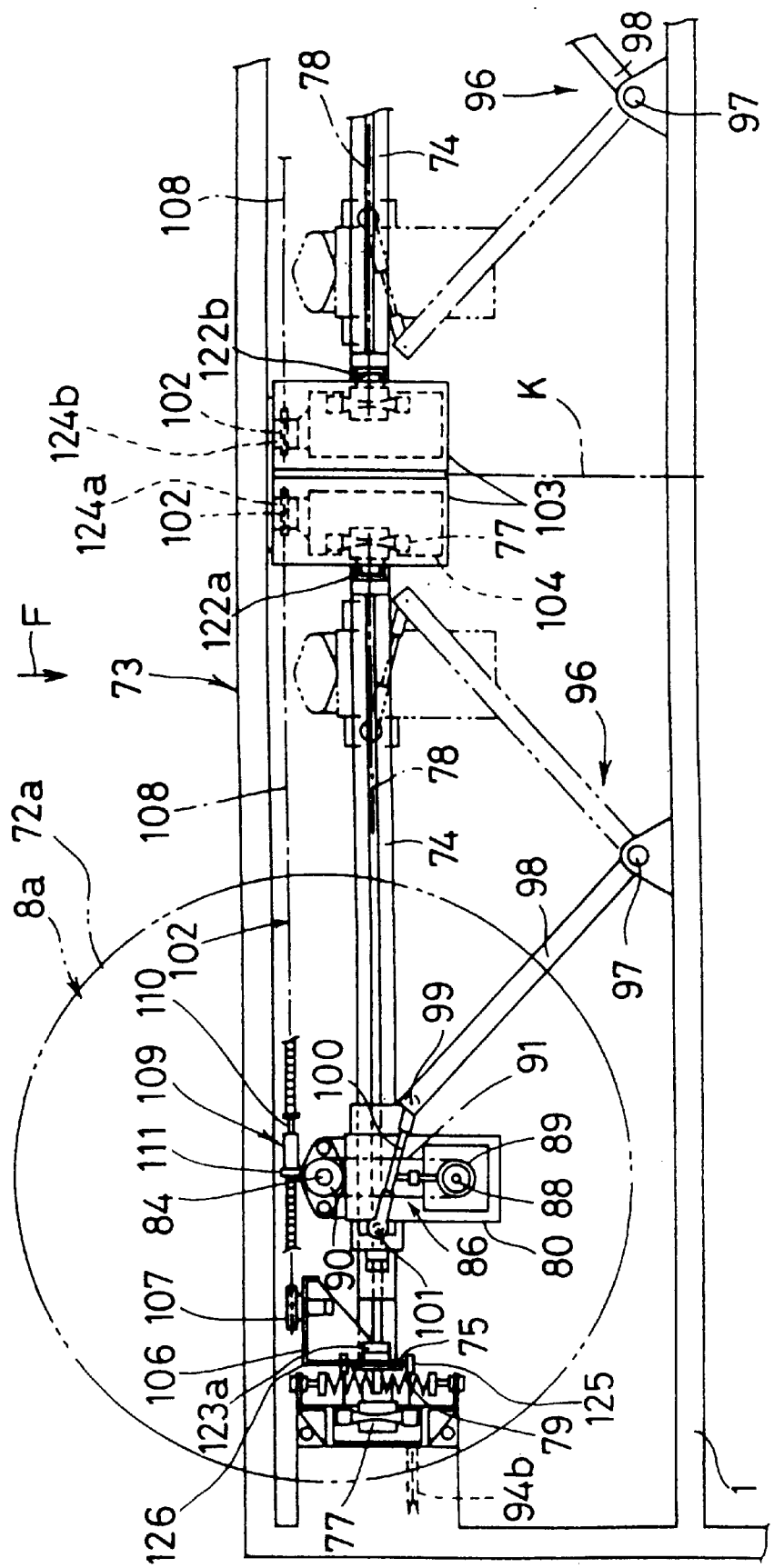
FIG. 12 is a plan view of a side brush driving device section in said car washing machine.
Figure 13:
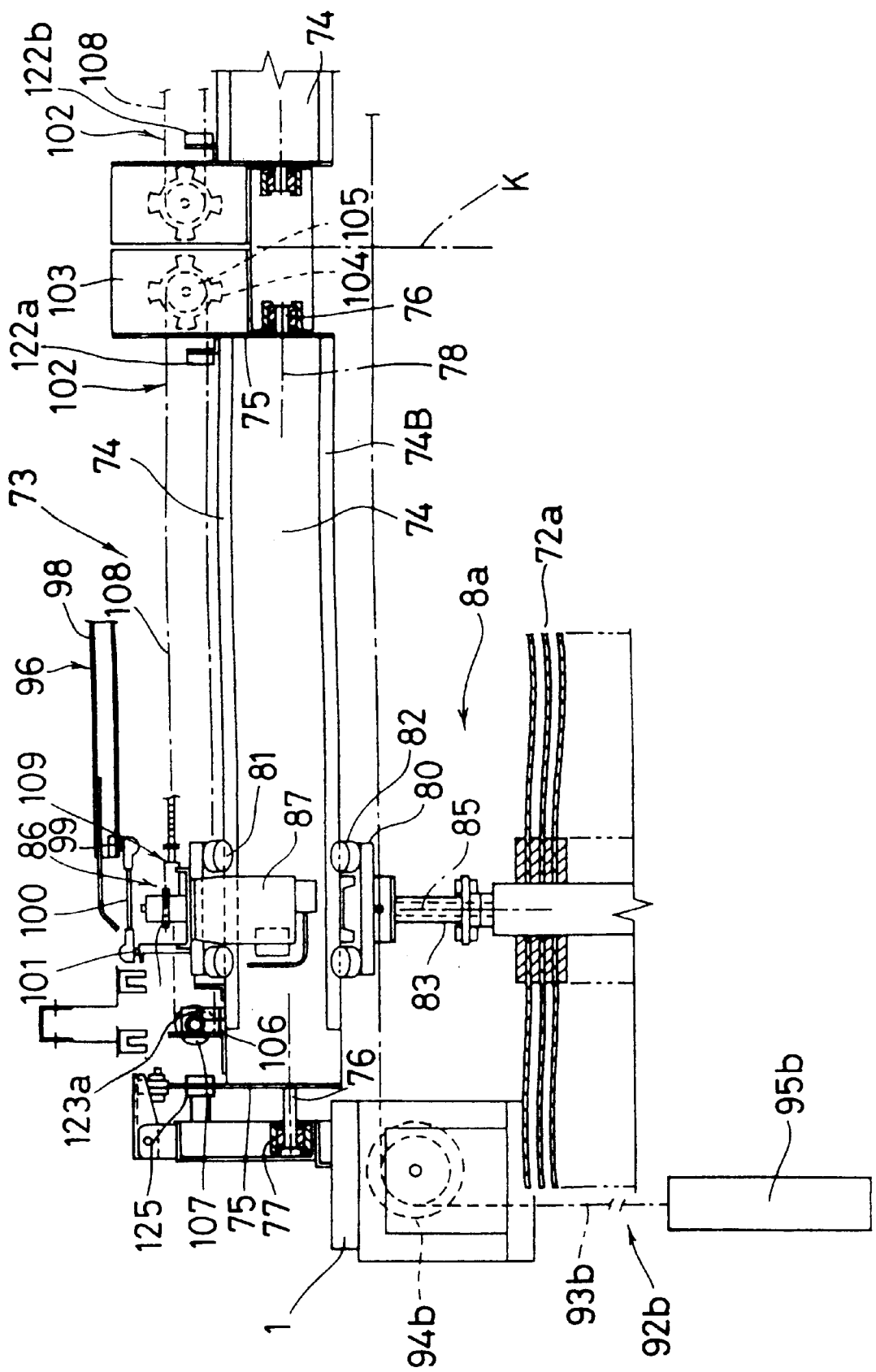
FIG. 13 is a front view of the side brush driving device in said car washing machine.
Figure 14:
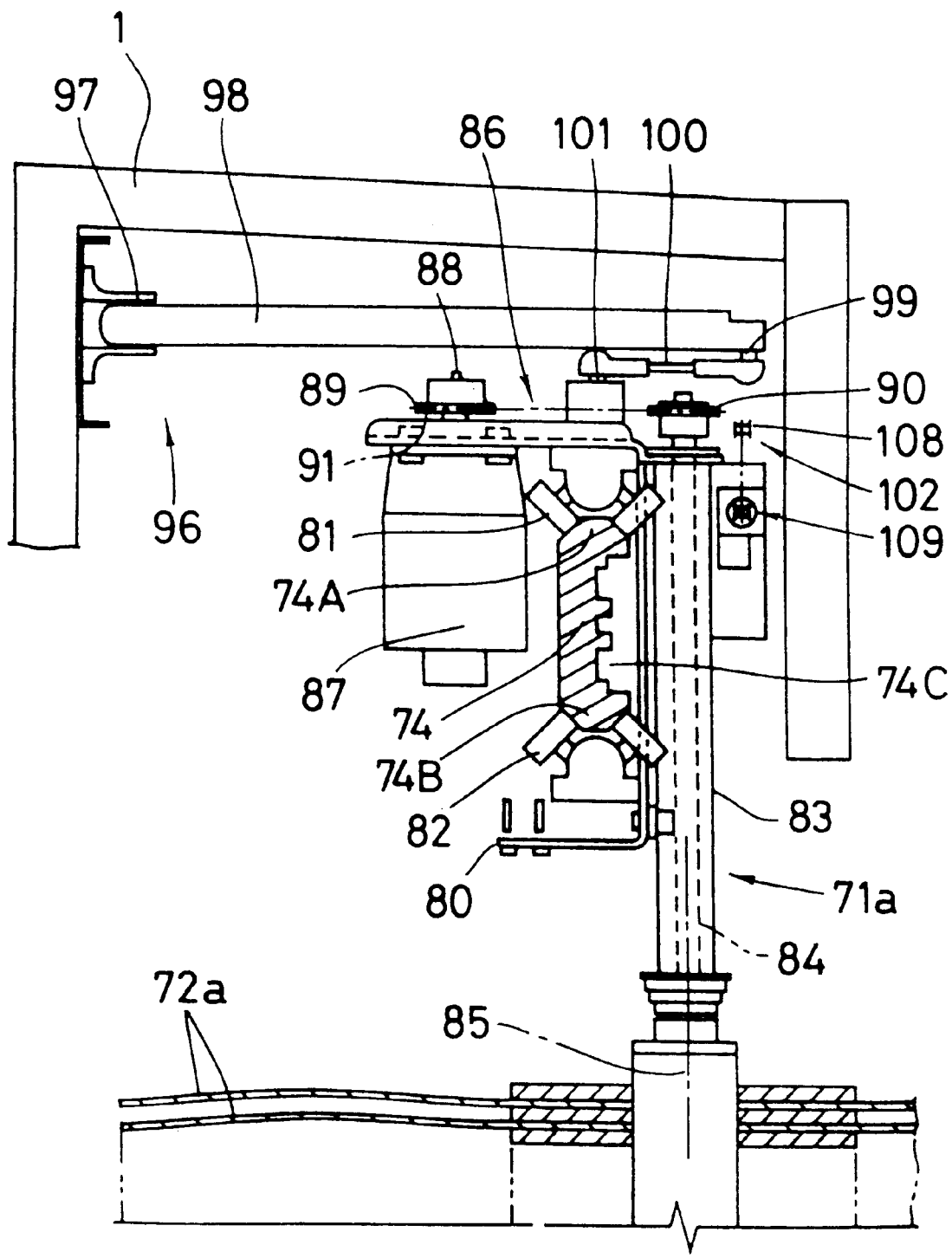
FIG. 14 is a side view, in longitudinal section, of the side brush driving device in said car washing machine.

The side brush devices 8*a*, 8*b*, as shown in FIG. 11, respectively comprise movable bodies 71*a*, 71*b*, and side brush bodies 72*a*, 72*b* disposed under said movable bodies 71*a*, 71*b*, and as shown in FIGS. 12 through 14, they are disposed on the side associated with the car washing machine body 1 through the side brush driving device 73.

Disposed on top of the car washing machine body 1 is a long guide rail 74 extending transversely (widthwise) at a right angle with the vehicle transporting direction F. The guide rail 74 is formed with a ridge-shaped guide portion 74A at the upper end thereof, with an inverted ridge-shaped guide portion 74B at the lower end thereof, and with a groove portion 74C on one lateral surface thereof. Further, the guide rail 74 comprising the portions 74A through 74C is formed by extrusion-molding aluminum which is then cut into required lengths.

Support shaft 76 extends lengthwise from the opposite ends of said guide rail 74, said support shafts 76 being supported at the car washing machine body 1 through bearings 77, whereby said guide rail 74 is rotatable around a transverse axis 78. In addition, the rotation is effected against the force of a pair of springs 79, and the neutral position is maintained by the elastic force of the springs 79.

A movable body 80 is provided which is movable as it is supported and guided by said guide rail 74, said movable body 80 being C-shaped in a side view and supported and guided by a plurality of upper rollers 81 capable of abutting from above against said ridge-shaped guide portion 74A and a plurality of lower rollers 82 capable of abutting from below against said inverted ridge-shaped guide portion 74B. Said movable bodies 80 have vertical bearings 83 attached thereto, said bearings 83 supporting the shafts of said side brush bodies 72*a*, 72*b*; thus, the side brush bodies 72*a*, 72*b* are rotatable around the vertical axes 85.

The rotary driving device 86 for said side brush bodies 72*a*, 72*b* comprises a rotation motor 87 attached to the movable body 80, a drive sprocket 89 attached to the output shaft 88 thereof, a driven sprocket 90 attached to the side brush shaft 84, and a chain entrained between the sprockets 89 and 90.

Weight urging devices 92*a*, 92*b* are provided for urging the side brush devices 8*a*, 8*b* toward the car washing machine center K. That is, wires 93*a*, 93*b* connected to the movable bodies 80 are drawn outward beyond the car washing machine center K, said wires 93*a*, 93*b* being guided by guide wheels 94*a*, 94*b* attached to the car washing machine body 1 and then being connected to weights 95*a*, 95*b* positioned in the car washing machine body 1.

A support device 96 supports a feeder line for said side brush devices 8*a*, 8*b*, that is, for the movable body 80. The support device 96 comprises an arm 98 swingably attached to the car washing machine body 1 through a vertical shaft 97, and a link 100 relatively swingably connected to the free end of said arm 98 through a vertical pin 99, the free end of said link 100 being connected to the movable body 80 through a vertical pin 101.

The guide rails 74 have operating devices 102 for transversely moving the side brush devices 8*a*, 8*b* through said movable bodies 80 and transversely positioning the same.

The operating device 102 comprises a moving motor 104 attached to the inner end of the guide rail 74 through a bracket 103, a drive sprocket 105 attached to the longitudinal output shaft thereof, a driven sprocket 107 attached to the outer end of the guide rail 74 through a bracket 106, a drive chain entrained between the sprockets 105 and 107, and an operatively connecting device 109 for operatively connecting said drive chain 108 to said movable body 80.

Figure 15:
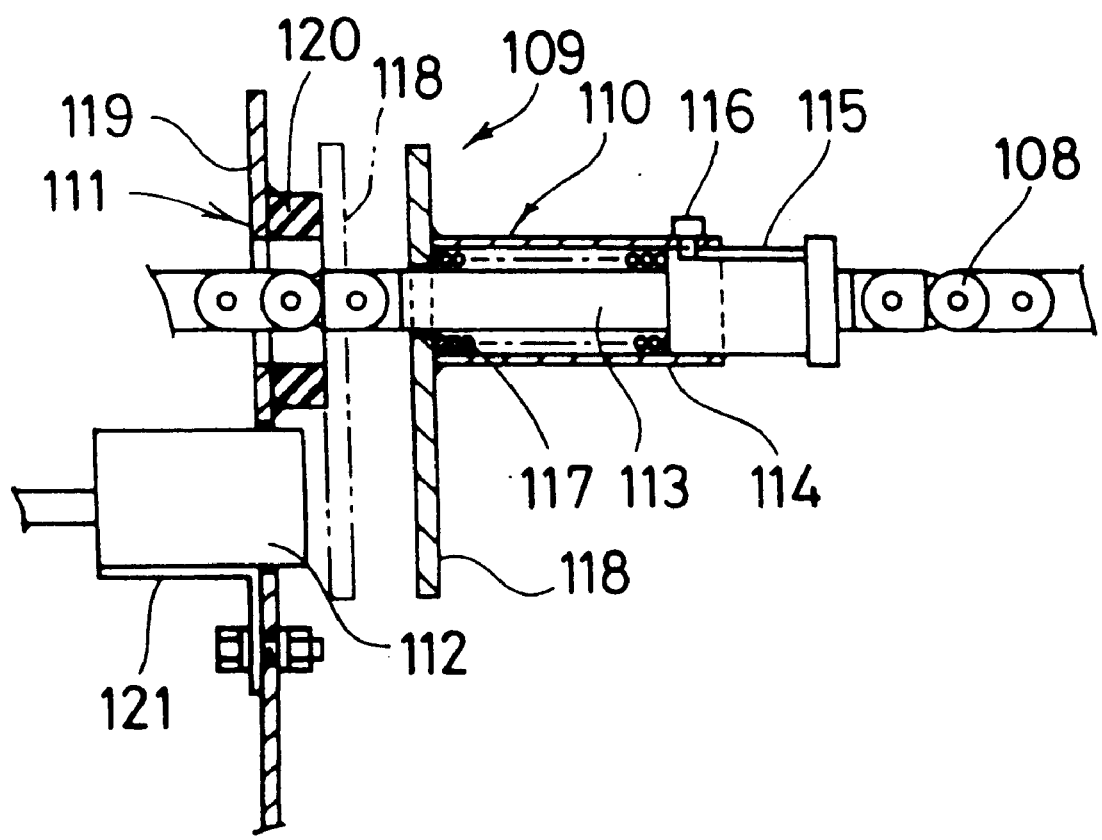
FIG. 15 is a front view, in longitudinal section, of a positioning device in said car washing machine, taken during positioning.

The operatively connecting device 109, as shown in FIG. 15, comprises a transmission member 110 associated with the drive chain 108, a driven member 111 opposed to said transmission member 110 from the outside and associated with the movable body 80, and a proximity detecting device 112 for detecting the abutment between the members 110 and 111, and allows said movable body 80 to move relative to the drive chain 108 away from the car washing machine center K.

That is, the transmission member 110 comprises a rod body 113 integrated with (or forming a part of) the drive chain 108, a sleeve body 114 fitted on said rod body 113, a notch 115 and a bolt which allow relative movement of the two members 113 and 114 in a given range, a coil spring 117 urging the two members 113 and 114 away from each other, and a transmission side plate body 118 fixed to the outer end of said sleeve body 114.

Further, the driven member 111 comprises a driven side plate body 119 continuously extending from said movable body 80 and fitted on the drive chain 108, and an annular bush body 120 fixed to the inner surface of said driven side plate body 119. And said proximity detecting device 112 is attached to the driven side plate body 119 through a bracket 121, said proximity detecting device 112 being in the form of a proximity switch arranged such that, as shown in broken line, when the transmission side plate body 118 and bush body 120 come in contact with each other, the outer surface of the driven side plate body 118 causes detection. Further, a closed limit detecting device 122 is provided which comprises a proximity switch for detecting the arrival of the movable body 80 at the end of the guide rail 74 associated with the car washing machine body 1. An opened limit detecting device 123 is provided which comprises a proximity switch for detecting the arrival of the movable body 80 at the outer end of the guide rail 74, and a pulse encoder 124 is mounted on the moving motor 104. Further, there is a rear inclination detecting device 125 comprising a limit switch for detecting the rearward inclination of a flange 75.

According to said side brush devices 8a, 8b, the side brush bodies 72a, 72b are rotated around the vertical axes 85 by rotating the side brush shaft 84 by the rotating motor 87, and the shock produced when they come in contact with the front and rear surfaces of the vehicle 2 is absorbed as the guide rail 74 turns around the transverse axis 78. In this case, the pair of guide rails 74 independently turn around the transverse axes 78, so that even if there is a time lag between the respective contact actions of the side brush bodies 72a, 72b (due to the inclination resulting from the irregular stop positions of vehicles), they are turned according to such time lag in response to the shock, realizing satisfactory followability, thereby preventing the side brush bodies 72a, 72b from being unduly loaded.

Further, the forward rotation of the moving motor 104 forwardly moves the drive chain 108 through the drive sprocket 105. The forward movement of said drive chain 108 outwardly moves the transmission member 110 of the operatively connecting device 109, thus integrally moving the driven member 111 abutting against the transmission side plate body 118 of the transmission member 110 through the bush body 120. At the time of this abutment, the rod body 113 is moved against the force of the coil spring 117 with respect to the sleeve body 114, whereby the shock produced upon abutment is mitigated. In this manner, the side brush devices 8a, 8b can be moved away from the car washing machine center K.

And through reverse operation, the side brush devices 8a, 8b can be moved toward the car washing machine center K. That is, the reverse operation of the moving motor 104 reversely moves the drive chain 108 through the drive sprocket 105, thus inwardly moving the transmission member 110 of the operatively connecting device 109. Then, since the movable body 80 is under an urging force due to the weight urging device 92, the driven member 111 abutting against the transmission member 110 is integrally moved; thus, approaching movement can be attained.

Further, as shown in FIG. 15, when the bush body 120 fitted on the drive chain 108 is moved away from the transmission side plate body 118, the proximity detecting device 112 turns off.

<Control Arrangement>

Figure 16:
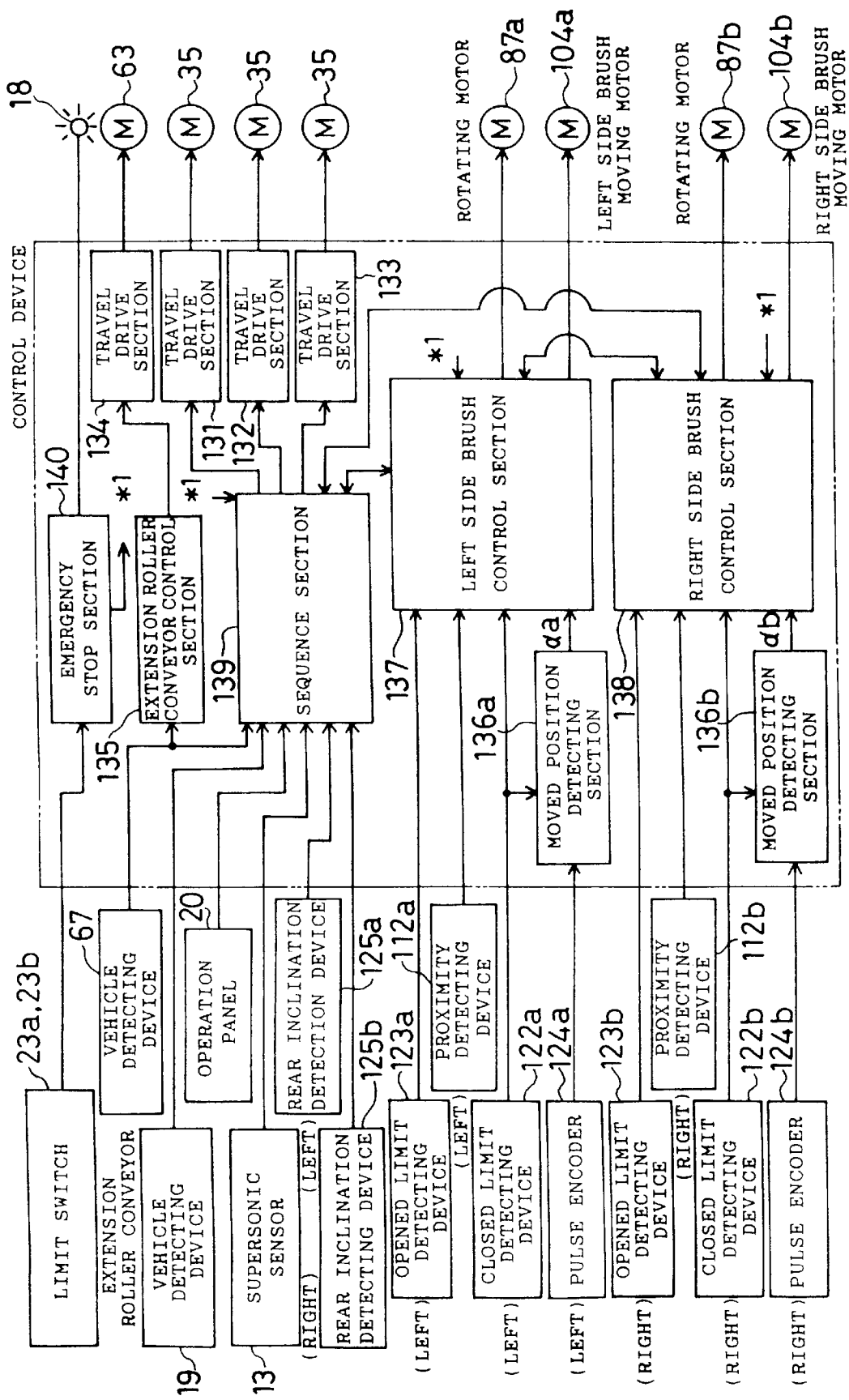
FIG. 16 is a block diagram of a control device in said car washing machine.

A control program for said side brush devices 8a, 8b and roller conveyor device 3 is shown in FIG. 16.

As shown in the control block diagram of FIG. 16, connected to the control device 17 are: an operation panel 20; a supersonic sensor 13; limit switches 23a, 23b for the deviation detecting devices; a vehicle detecting device 19 for the front roller conveyor; a vehicle detecting device 67 for the extension roller conveyor; closed limit detecting devices 122a, 122b, opened limit detecting devices 123a, 123b, pulse encoders 124a, 124b, and rear inclination detecting device 125a, 125b which are provided for the side brush devices 8a, 8b; an emergency stop indicator lamp 18; a motor 35 for roller conveyors 36, 37, 38; a motor 63 for the extension roller conveyor; and rotating motors 87a, 87b to rotate the side brush devices 8a, 8b and moving motors 104a, 104b to move the side brush devices 8a, 8b.

The control device 17 comprises: travel drive sections 131–134 in the form of inverters corresponding to the roller conveyors 35, 36; an extension roller conveyor control section 135; moved position detecting sections 136a, 136b; a left side brush control section 137 being connected to a closed limit detecting device 122a, an opened limit detecting device 123a, a proximity detecting device 112a and a moved position detecting section 136, and used to drive the rotating motor 87b and moving motor 104; a right side brush control section 138 being connected to said closed limit detecting device 123b, an opened limit detecting device 122b, a proximity detecting device 112b and the moved position detecting section 136b, and used to drive the rotating motor 87b and moving motor 104b; a sequence section 139 being connected to an operation panel 20, a supersonic sensor 13, a vehicle detecting device 19 for the front roller conveyor, a vehicle detecting device 67 for the extension roller conveyor, and rear inclination detecting devices 125a, 125b for the side brush devices 8a, 8b, and used to coordinatingly control the travel drive sections 131–133, an extension roller conveyor control section 135, a left side brush control section 137 and a right side brush control section 138; and an emergency stop section 140.

Said extension roller conveyor control section 135, moved position detecting sections 136a, 136b, left side brush control section 137, right side brush control section 138, and sequence section 139 are constituted by a microcomputer.

Connected to said emergency stop section 140 are the limit switches 23a, 23b and emergency indicator lamp 18 for the deviation detecting device. When at least one of these limit switches 23a, 23b is turned off, the emergency indicator lamp 18 is lighted and an emergency stop signal is fed to the extension roller conveyor control section 135, left side brush control section 137, right side brush control section 138, and sequence section 139. Upon receiving said emergency stop signal, the extension roller conveyor control section 135, left side brush control section 137, right side brush control section 138, and sequence section 139 bring all motors that are being driven to an emergency stop.

Connected to said extension roller conveyor control section 135 are the vehicle detecting device 67 for the extension roller conveyor and the travel drive section 134 for the motor 63 of the extension roller conveyor. When the vehicle detecting device 67 is actuated, that is, when the vehicle 2 is transported onto the extension roller conveyors 32a, 32b, a stop signal is fed to the travel drive section, and when the vehicle detecting device 67 is turned off, that is, when the vehicle 2 is transported out of the extension roller conveyors 32a, 32b, a drive signal is fed to the travel drive section 134 after a predetermined time, thereby driving the extension roller conveyors 32a, 32b.

Said moved position detecting sections 136a, 136b count the pulse signals (addition when the movable bodies 71a, 71b are moving in the separating direction, and subtraction when they are moving in the approaching direction) of the pulse encoders 124a, 124b from the closed limit positions of the movable bodies 71a, 71b, so as to detect the positional data $\alpha a$, $\alpha b$ from the closed limit positions of the movable bodies 71a, 71b, and feed said positional data to the left and right side brush devices 137 and 138.

Figure 17:
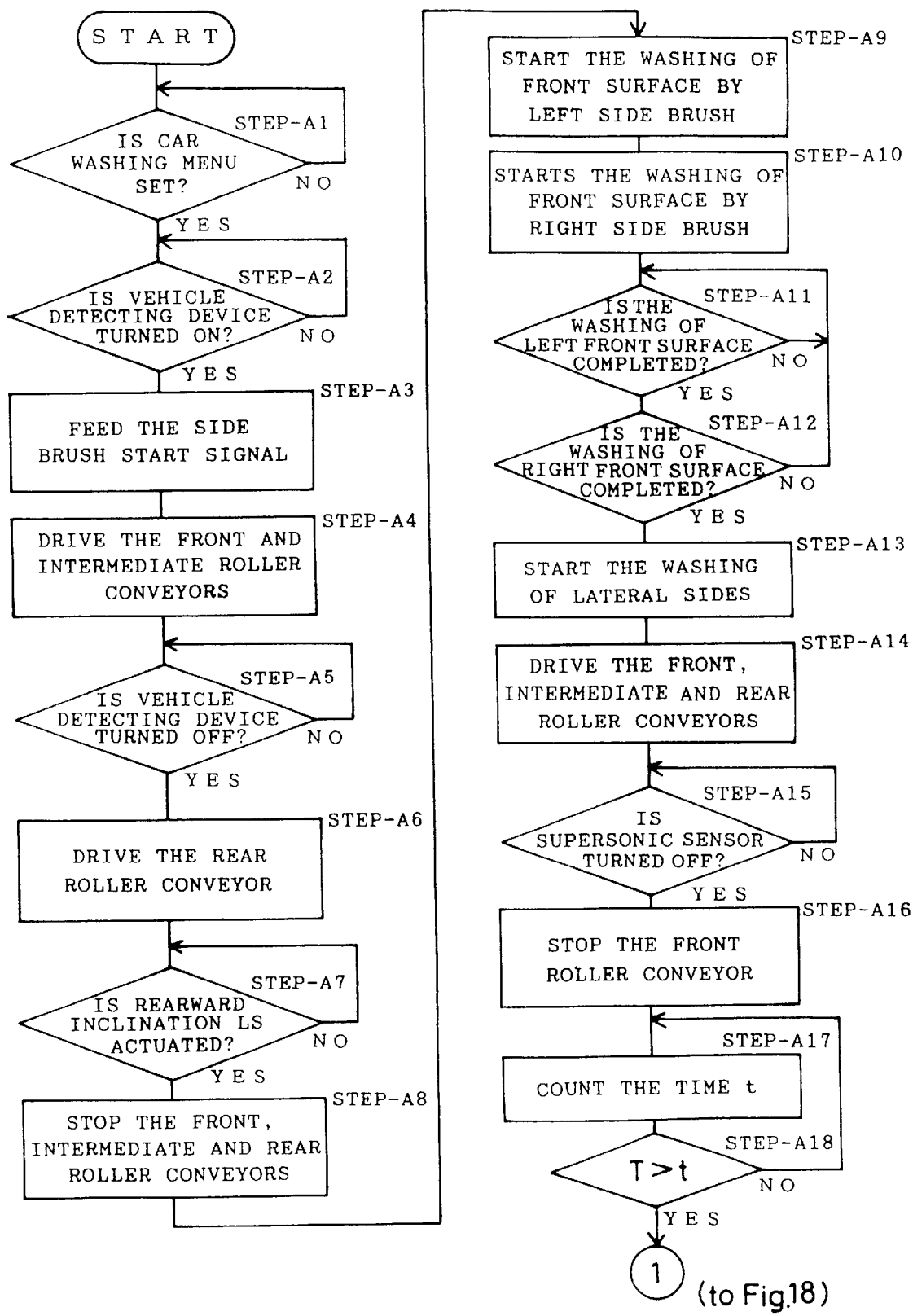
FIG. 17 is a flowchart showing the operation of the sequence section of the control device in said car washing machine.
Figure 18:
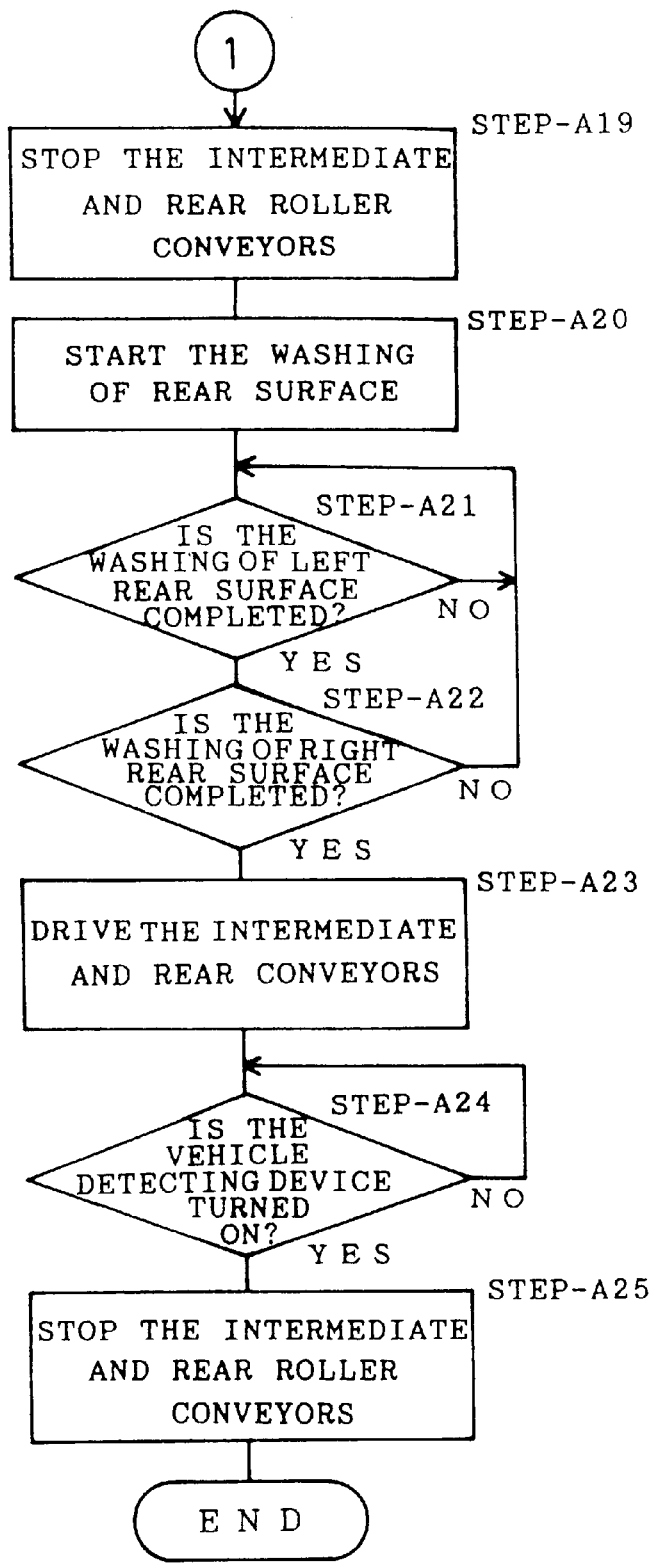
FIG. 18 is a flowchart showing the operation of the sequence section of the control device in said car washing machine.

A detailed description will now be given of the control operation of the sequence section 139, and the left and right side brush devices 8a, 8b, along with the action of the entire car washing machine in washing the vehicle 2, with reference to the flowchart for the sequence section 139 in FIGS. 17 and 18, and the flowchart for the left side brush control section 137 in FIGS. 19 and 20. In addition, the operation of the right side brush control section 138 is the same as (but symmetrical to) that of the left side brush control section 137, so that a description thereof will be omitted. In addition, the side brush devices 8a, 8b, as shown in FIG. 1, are on standby in lateral end positions spaced from the center of the car washing machine body 1.

First, the driver of the vehicle 2 moves the vehicle 2 to the operation panel 20, sets the menu and then drives it onto the front roller conveyor 36, whereupon he stops the vehicle.

The sequence section 139 confirms that the car washing menu has been determined by the operation panel 20 (step-A1) and when it confirms the operation of the vehicle detecting device 19 (step-A2), it feeds a start signal to the side brush control sections 137, 138 (step-A3) and feeds a travel instruction signal to the travel drive sections 131, 132 for the front and intermediate roller conveyors. (step-A4). Subsequently, it confirms whether or not the vehicle detecting device 67 for the extension roller conveyors is off (step-A5), and if it is off, sequence section feeds a travel instruction signal to the travel drive section 133 for the extension roller conveyors (step-A6).

Figure 19:
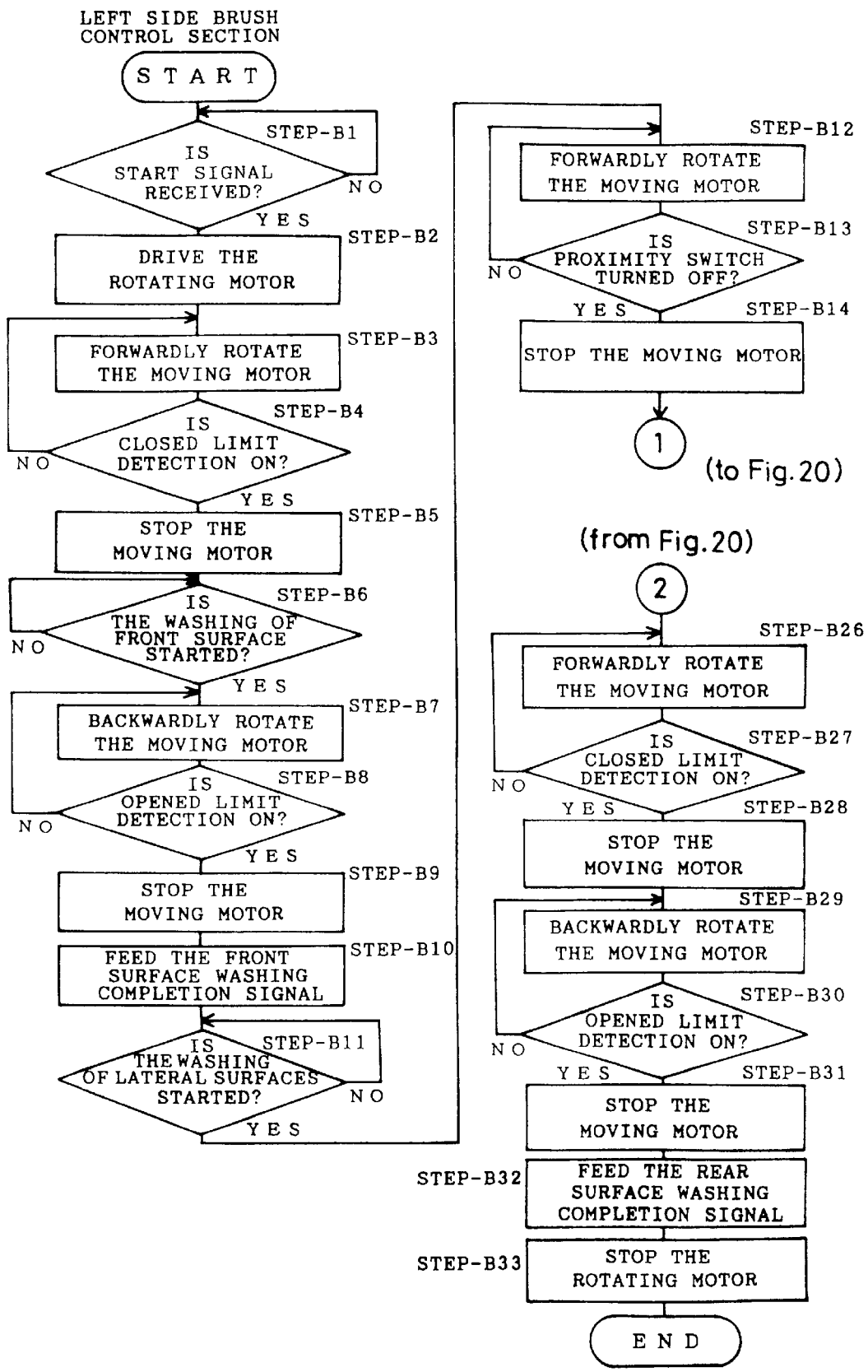
FIG. 19 is a flowchart showing the operation of the left side brush control section of the control device in said car washing machine.
Figure 20:
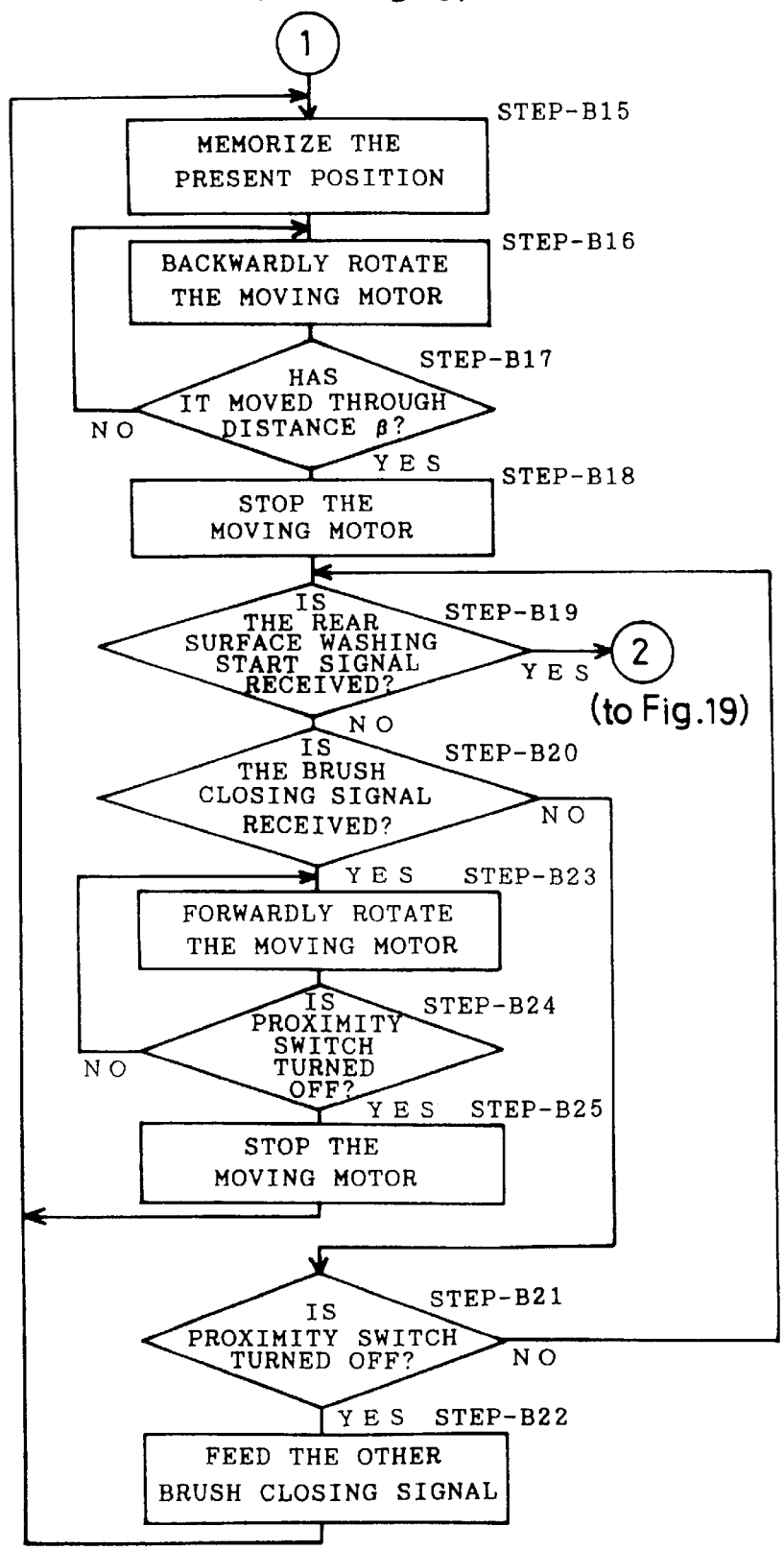
FIG. 20 is a flowchart showing the operation of the left side brush control section of the control device in said car washing machine.

When the left side brush control section 137, as shown in FIG. 19, receives said start signal (step-B1), it drives the rotating motor 87a (step-B2), forwardly rotating the drive motor 104 to rotate the drive chain in one direction, moving the transmission member 110 toward the car washing machine body center K (step-A3), and when the closed limit detecting device 122a is operated (step-B4), it stops the rotation of the moving motor 104a (step-B5).

As shown by phantom lines in FIG. 21 (a), the side brush devices 8a, 8b are moved toward the car washing machine body center K under the urging force of the weights 95a, 95b, and stopped at the closed limit position. At this time, since the driven member 111 is moved while abutting against the transmission member 110, the proximity detecting device 112 is turned on.

The travel drive sections 131–133 for the main roller conveyor drive the motor 35 and hence the roller conveyors 31a, 31b according to the travel instruction signal, whereby the vehicle 2 starts advancing.

Then, when the front surface of the vehicle 2 contacts the side brush bodies 72a, 72b and one of the rear inclination detecting devices 125a, 125b is actuated (step-A7), the sequence section 139 feeds a stop instruction signal to the travel drive sections 131–133 for the main roller conveyor (step-A8), a front car surface washing start signal to the left side brush control section 137 (step-A9), and a front car surface washing start signal to the right side brush control section 138 after a given period of time so as to prevent the left and right side brush devices 8a and 8b from interfering with each other (step-A10).

The travel drive sections 131–133 for the main roller conveyor stop the motor 35 and hence the roller conveyors 31a, 31b according to the stop instruction signal, whereby the vehicle 2 stops.

<Washing of Front Surface 2c of Vehicle 2>

When the left side brush control section 137 receives the front car surface washing start signal (step-B6), it reversely drives the moving motor 104a of the left side brush device 8a to rotate the drive chain in the other direction, moving the transmission member 110 in the direction away from the car washing machine body center K (step-B7), and when the opened limit detecting device 122a is actuated (step-B8), it stops the rotation of the moving motor 104a (step-B9), and feeds a front car washing completion signal to the sequence section 139 (step-B10).

Figure 21A:
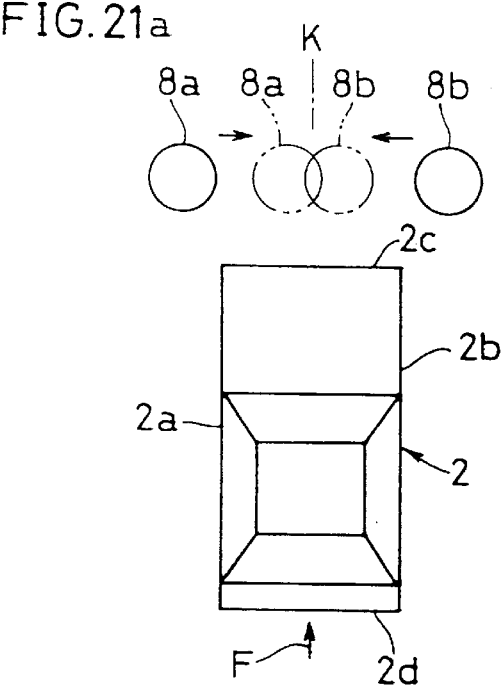
FIGS. 21a, 21b, 21c, and 21d are schematic plan views showing the movement of both side brush devices and a carriage during the washing of a vehicle in said car washing machine.
Figure 21B:
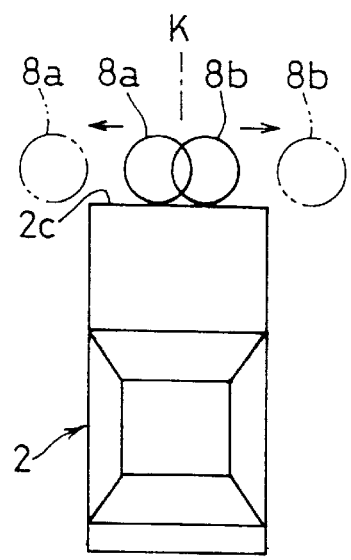
Figure 21C:
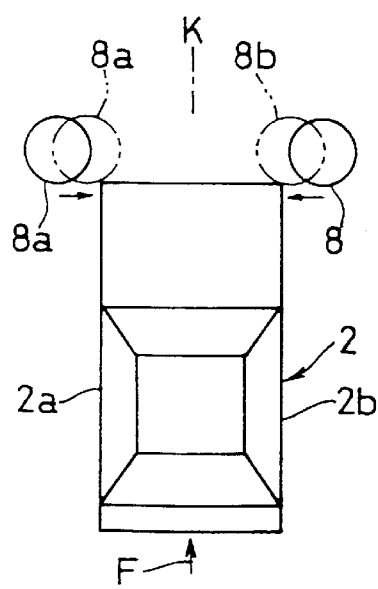

Thus, in the side brush devices 8a, 8b, the transmission member 110 pushes the driven member 111 against the urging force of the weights 95a, 95b, so that, as shown by phantom lines in FIG. 21(b), the side brush devices 8a, 8b are moved in the direction away from the car washing machine body center K, whereby substantially the left half of the front surface 2c of the vehicle 2 is washed by one side brush device 8a, while substantially the right half of the front surface 2c of the vehicle 2 is washed by the other side brush device 8b.

When the sequence section 139 receives a front car surface washing completion signal from the side brush control sections 137, 138 (steps-A11, A12), it feeds a lateral car surface washing start signal to the side brush control sections 137, 138 (step-A13), and a stop instruction signal to the travel drive sections 131–133 for the main roller conveyor (step-A14). Subsequently, whether or not the supersonic sensor 13 is off is confirmed (step-A15), and if it is off, a stop instruction signal is fed to the travel drive section 131 for the front conveyor (step-A16), and the counting of the time t is started (step-A17). When this time count t equals to a predetermined time T (step-A18), a stop instruction signal is fed to the travel drive sections 132, 138 for the intermediate and rear roller conveyors (step-A19), and a rear car surface washing start signal is fed to the side brush control sections 137, 138. (step-A20).

The travel drive sections 131–133 for the main roller conveyor drive the roller conveyors 31a, 31b according to the travel instruction signal, so that the vehicle 2 starts advancing. Further, the travel drive section 131 for the front roller conveyor stops the driving of the front conveyor 36 according to the stop instruction signal, and the travel drive sections 132, 133 for the intermediate and rear roller conveyors stop the driving of the intermediate and rear roller conveyors 37, 38 according to the stop instruction signal.

When the washing of the front surface of the vehicle 2 is completed by the driving of these main roller conveyors 36, 37, 38, the vehicle 2 is advanced again, and when the side brush bodies 72 are positioned on the rear surface of the vehicle 2, the vehicle 2 is stopped.

<Washing of Lateral Surfaces 2a, 2b of Vehicle 2>

When the left side brush control section 137 receives said lateral car surface washing start signal (step-B11), it forwardly rotates the moving motor 104 for the side brush device 8a to rotate the drive chain in one direction, moving the transmission member 110 toward the car washing machine body center K (step-B12), and when the proximity detecting device 112a is turned off (step-B13), it stops the rotation of the moving motor 104a (step-B14), memorizing the present movement detection position αa of the moved position detecting section 136a (the memorized value being referred to as αaK) (step-B15), subsequently reversely rotating the moving motor 104 to rotate the drive chain in the other direction, moving the transmission member 110 in the direction away from the car washing machine body center K (step-B16). When the movement detection position αa of the moved position detecting section 136 is equal to [αaK+β] (where β is a positive predetermined distance) (step-B17), the rotation of the moving motor 104 is stopped (step-B18). At this time, the proximity detecting device 112 is restored to the on-state.

Then, whether or not a rear portion washing start signal is received (step-B19) is confirmed, and if it is not received, it is confirmed whether or not a "brush closing" signal to be later described is received from the right side brush control section 138 (step-B20). When this "brush closing" signal is not received, it is confirmed whether or not the proximity detecting device 112 is off (step-B21). If the proximity detecting device 112a is off, a "brush closing" signal is fed to the right side brush control section 138 (step-B22), said steps-B15–B18 being repeated.

In the step-B20, when the receiving of the "brush closing" signal is confirmed, the moving motor 104a for the left side brush device 8a is forwardly rotated to rotate the drive chain in one direction, moving the transmission member 110 toward the car washing machine body center K (step-B23). When the proximity switch 112a is turned off (step-B24), the rotation of the moving motor 104 is stopped (step-B25), said steps-B15–B18 being repeated.

Figure 21D:
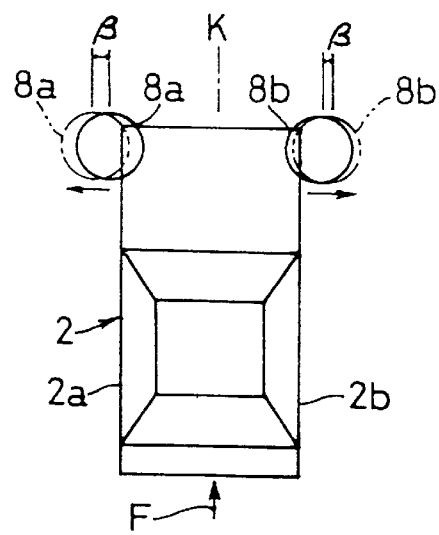

Thus, in the side brush devices 8a, 8b, the moving motors 104 are forwardly rotated to rotate the drive chains 108 in one direction, moving the transmission members 110 toward the car washing machine body center K. As shown by phantom lines in FIG. 21(c), the side brush devices 8a, 8b are moved toward the car washing machine body center K under the urging force of the weights 95a, 95b, until they abut against the lateral surfaces 2a, 2b of the vehicle 2, whereupon they are stopped. In this state, however, the side brush devices 8a, 8b are too close to the vehicle 2. And immediately thereafter, the transmission member 110 is once moved away from the driven member 111 toward the car washing machine body center K and the proximity detecting device 112 is switched to the off-state. Thereby, the moving motor 104 is reversely rotated a predetermined number of revolutions, moving the drive chain 108 in the other direction, moving the transmission member 110 away from the car washing machine body center K by a predetermined distance β. As shown in FIG. 21(d), the transmission member 110 abuts against the driven member 111, pushing the driven member 111 against the urging force of the weights 95a, 95b, so that the side brush devices 8a, 8b are moved away from the car washing machine body center K by the predetermined distance β. Thereby, the distance between one side brush device 8a and one lateral surface 2a of the vehicle 2, and the distance between the other side brush device 8b and the other lateral surface 2b of the vehicle 2 can be adjusted to the respective optimum values.

And while the vehicle 2 is being transported, the lateral surfaces 2a, 2b of the vehicle 2 are washed by the side brush devices 8a, 8b.

In the case where the vehicle 2 is being transported as it is deviated to one side with respect to the center of the car washing machine body 1, first, one side brush device 8a abuts against one lateral surface 2a of the vehicle 2 and moves a predetermined distance β in the direction B away from the center of the car washing machine body 1, and a little later the other side brush device 8b abuts against the other lateral surface 2b of the vehicle 2 and moves the predetermined distance β in the direction B away from the center of the car washing machine body 1. Thus, even if the vehicle 2 is deviated to one side, the distances between the side brush devices 8a, 8b and the lateral surfaces 2a, 2b of the vehicle 2 can be adjusted to optimum values.

Figure 22A:
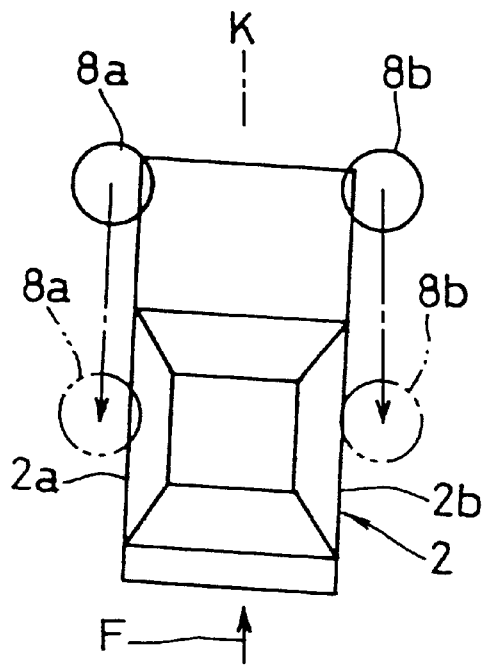
FIGS. 22a and 22b are schematic plan views showing the movement of the side brush devices and a carriage during the washing of a vehicle in said car washing machine.
Figure 22B:
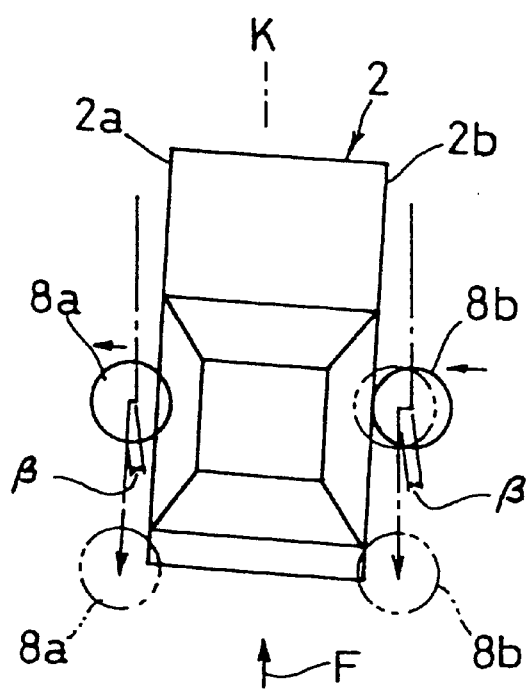

Further, as shown in FIG. 22, in the case where said vehicle 2 is being transported as it is inclined with respect to the vehicle transport direction F, one side brush device 8a (8b) is pushed by one lateral surface 2a (2b) of the vehicle 2 to move in the direction away from the car washing machine body center K, while the other side brush 8b, (8a) is spaced from the other lateral surface 2b (2a) of the vehicle 2. As shown in FIG. 22(a), when the transmission member 110 is spaced from the driven member 111 as the side brush device 8a is pushed by one lateral surface 2a of the vehicle 2, the proximity detecting device 112 is switched again to the off-state, and in response to this switching of the proximity detecting device 112 to the off-state, the side brush device 8a, as shown in FIG. 22(b), moves again the predetermined distance β in the direction away from the car washing machine body center K, while the other side brush device 8b moves toward the car washing machine body center K to abut against the other lateral surface 1b of the vehicle 2, and when the proximity detecting device 112 is switched to the off-state, it moves the predetermined distance β in the direction away from the car washing machine body center K. Thus, even if the vehicle 2 is inclined with respect to the transport direction when it is transported, the distances between the side brush devices 8a, 8b and the lateral surfaces 2a, 2b of the vehicle 2 can be adjusted to optimum values.

Thus, by moving the side brush devices 8a, 8b individually in the transverse direction, even if the vehicle 2 is being transported as it is somewhat deviated in the transverse direction, it is possible to fully wash the opposite lateral surfaces 2a, 2b by the side brush devices 8a, 8b without damaging the vehicle 2.

<Washing of Rear surface 2d of Vehicle 2>

When the left side brush control section 137 receives a rear surface washing start signal at the step-B19, it forwardly rotates the moving motor 104a of the left side brush device 8a to rotate the drive chain in one direction, moving the transmission member 110 toward the car washing machine body center K (step-B26), and when the closed limit detecting device 122a is actuated (step-B27), the rotation of the moving motor 104a is once stopped (step-B28).

Subsequently, after a predetermined time (some seconds), the moving motor 104 of the left side brush device 8a is reversely rotated to rotate the drive chain in the other direction, moving the transmission member 110 away from the car washing machine body center K (step-B29), and when the opened limit detecting device 123a is actuated (step-B30), the rotation of the moving motor 104a is stopped (step-B31) and a rear surface washing completion signal is fed to the sequence section 139 (step-B32), and the rotation of the rotating motor 87a is stopped (step-B33) to complete the operation.

Figure 23A:
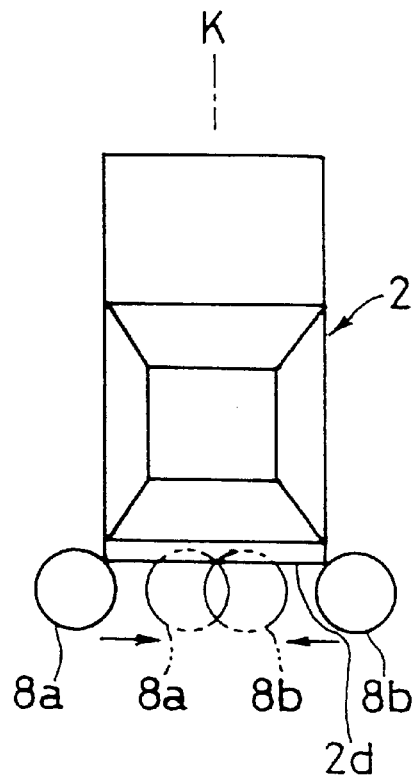
FIGS. 23a and 23b are schematic plan views showing the movement of the side brush devices and a carriage during the washing of a vehicle in said car washing machine.
Figure 23B:
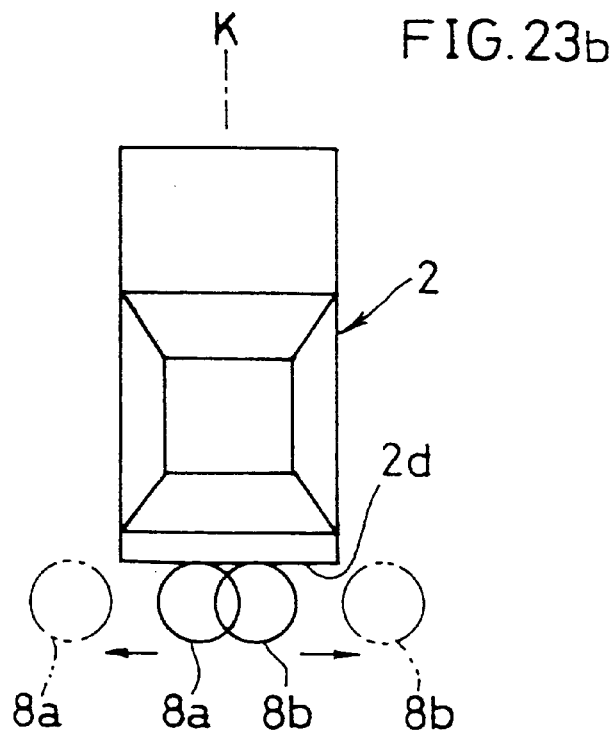

Thereby, the side brush devices 8a, 8b, as shown by phantom lines in FIG. 23(a), move toward the car washing machine body center K, stopping at the closed limit position. Subsequently, the transmission member 110 pushes the driven member 111 against the urging force of the weights 95a, 95b, and, as shown by solid lines in FIG. 23(b), the side brush devices 8a, 8b move in the direction away from the car washing machine body center K, so that substantially the left half of the rear surface 2d of the vehicle 2 is washed by one side brush device 8a, while substantially the right half of the rear surface 2d of the vehicle 2 is washed by the other side brush device 8b.

When the sequence section 139 receives a rear surface washing completion signal from the side brush control sections 137, 138 (steps-A21, A22), a travel instruction signal is fed to the travel drive sections 132, 133 for the intermediate and rear roller conveyors (step-A23). When the operation of the vehicle detecting device 67 for the extension roller conveyor has been confirmed (step-A24), a stop instruction signal is fed to the travel drive sections 132, 133 for the intermediate and rear roller conveyors (step-A25) to complete the operation.

The travel drive sections 132, 133 for the intermediate and rear roller conveyors drive the roller conveyors 37, 38 according to the travel instruction, so that the vehicle 2 starts advancing. Subsequently, the travel drive sections 132, 133 for the intermediate and rear roller conveyors stop the driving of the intermediate and rear roller conveyors 37, 38 according to the stop instruction signal.

When the washing of the rear surface 2d of the vehicle 2 is completed, the vehicle 2 is advanced again by the driving of these intermediate and rear roller conveyors 37, 38, and transported to the terminal end of the extension roller conveyor 32. Then, as the vehicle detecting device 67 is actuated, the transport is completed. The driver of the vehicle 2 drives the vehicle 2 out of the system by utilizing the lateral and rear slopes 68 and 38.

Driving the conveyor device 3 and the pair of retractable side brush devices 8a, 8b by said control device 17 makes it possible to wash the outer periphery (front surface, opposite lateral surfaces and rear surface) of the vehicle 2. Since the side brush devices 8a, 8b are retractable, the guide body for the conventional roller conveyor can be dispensed with, thereby making it possible to employ the conveyor device 3 of the present invention. Further, even if the vehicle 2 to be washed is parked in a deviated condition to one side or inclined, the washing of the vehicle can be properly effected without damaging the vehicle 2. As a result, the driving of the vehicle to be washed into the system can be facilitated. Further, the vehicle 2 can be parked without having to take care whether the steering wheel of the vehicle 2 to be washed is positioned on the right-hand or left-hand side.

One side brush device 8a is transversely reciprocated over the range of substantially the left half of the car washing machine body 1 while the other side brush device 8b is transversely reciprocated over the range of substantially the right half of the car washing machine body 1. As a result of this arrangement, the transverse distances to be traveled by the side brush devices 8a, 8b can be reduced and so can be the washing time, as compared with the conventional type.

Figure 24:
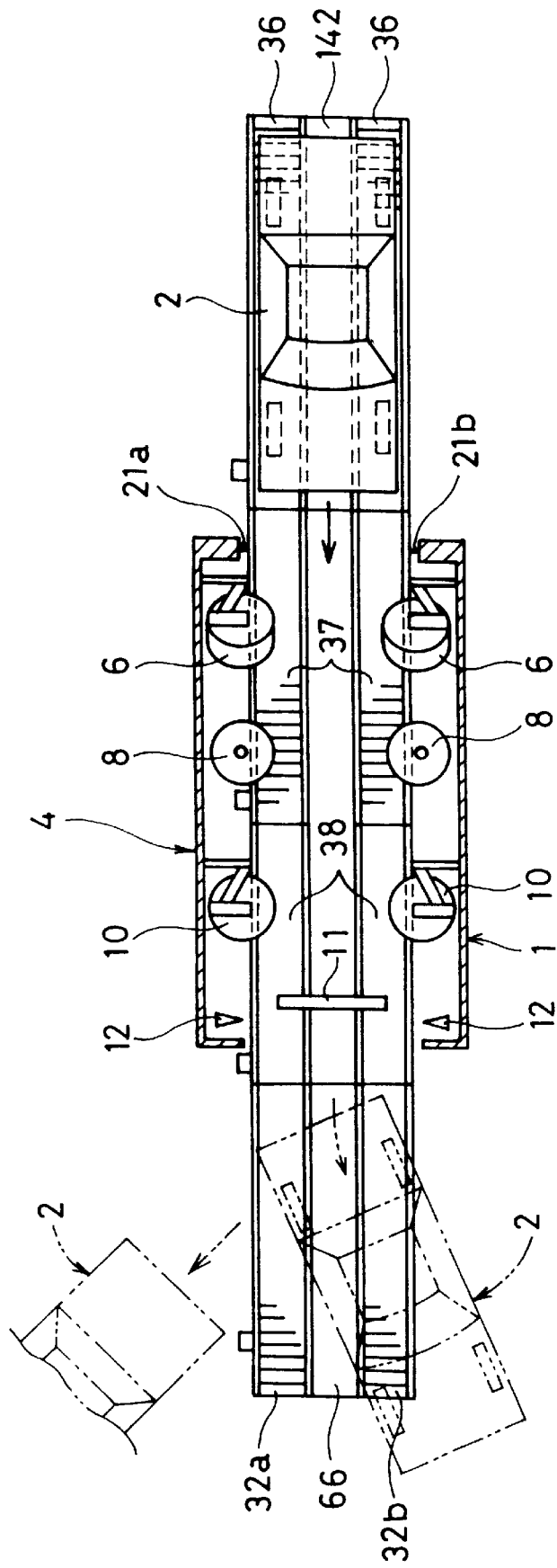
FIG. 24 is a plan view, partly broken away, of a car washing machine in another embodiment of the invention.
Figure 25:
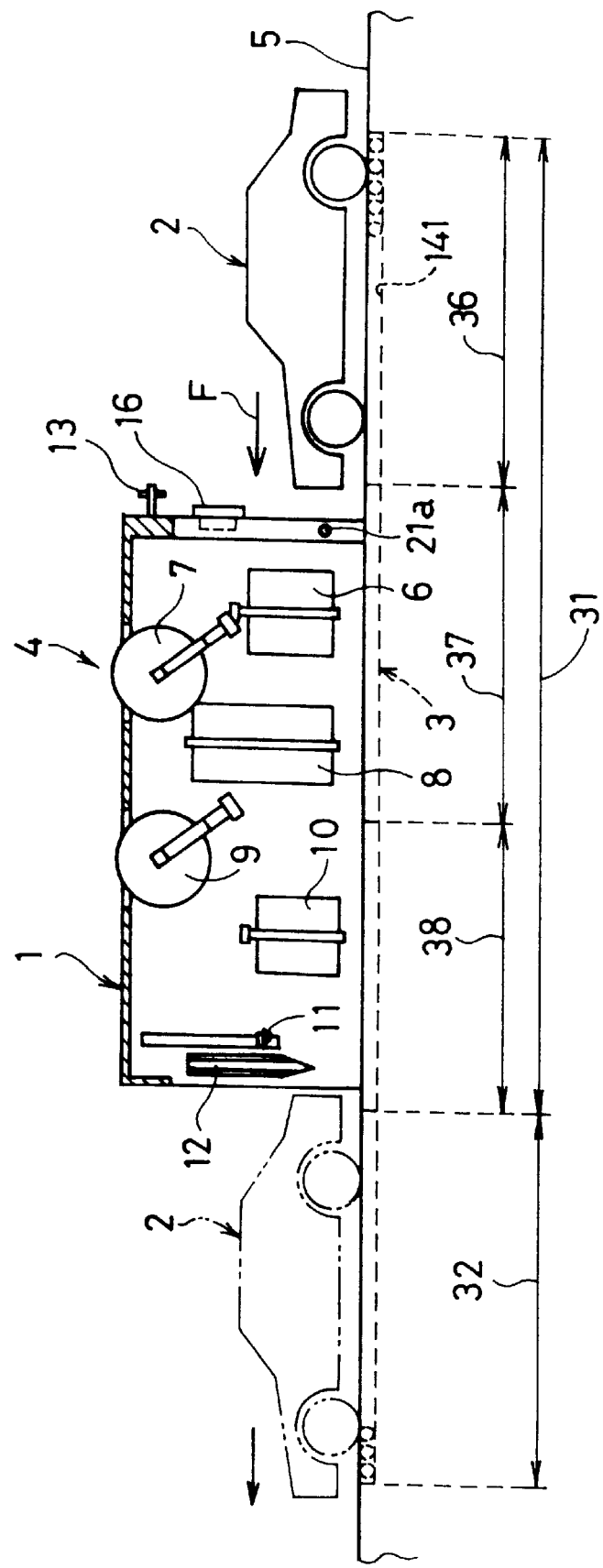
FIG. 25 is a plan view, partly broken away, of said car washing machine.
Figure 26:
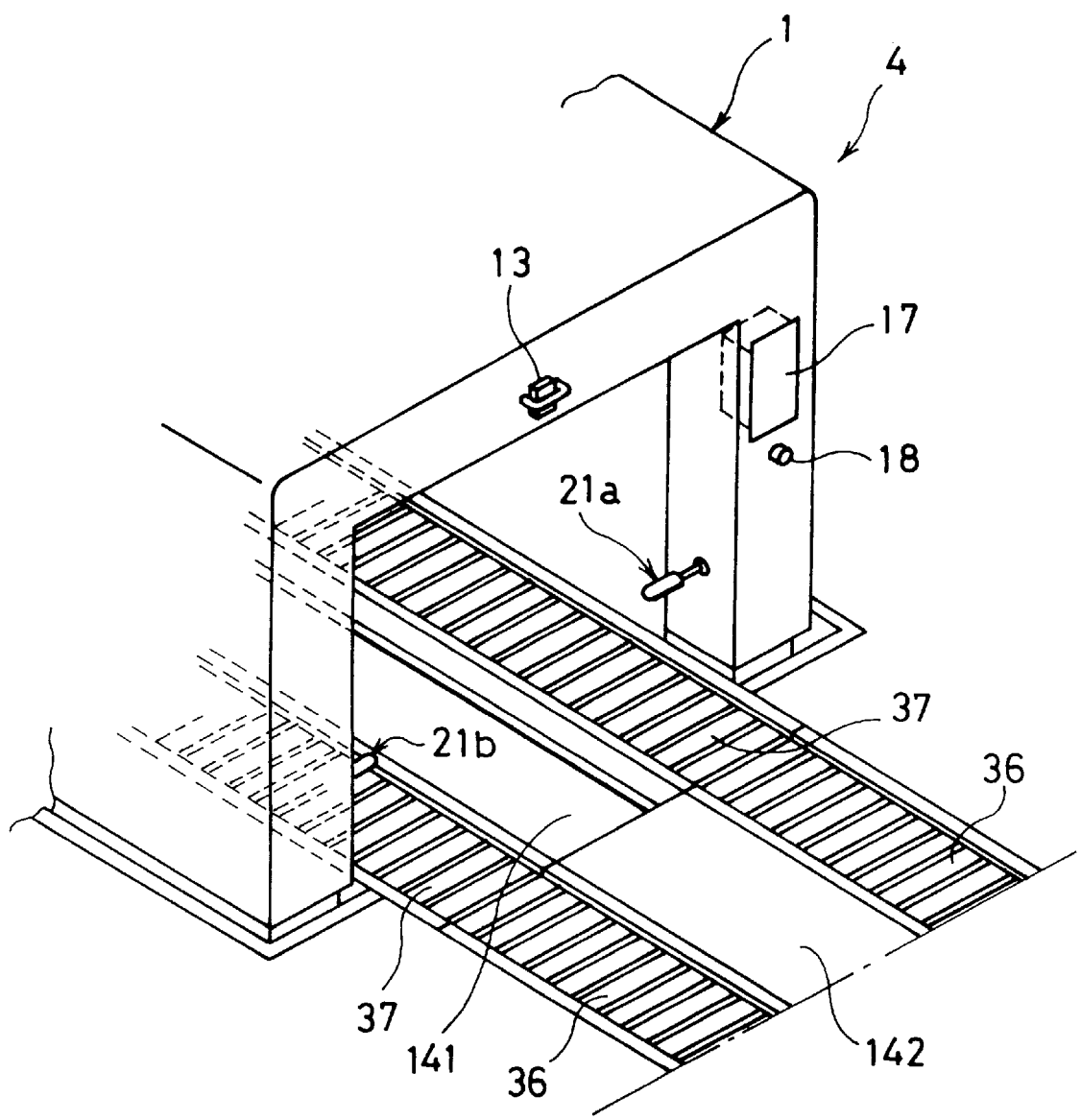
FIG. 26 is a perspective view of the front end of the car washing machine body.

In addition, although the conveyor device 3 installed on the floor 5 has been shown in the above embodiment, a pit 141 having an area corresponding to the area of installation of the conveyor device 3 and a depth corresponding to the height of the conveyor device 3 may be formed to install the conveyor device 3 therein, as shown in FIGS. 24–26, so that the level of the floor surface 5 becomes the same as the level of the upper surface of the conveyor device 3. According to this arrangement, the front, rear and lateral slops 39, 40 and 68 which are used in the above embodiment can be dispensed with, and it is possible to eliminate the anxiety felt by the driver as driving the vehicle 2 to get on and off the conveyor device 3 provided with the slopes. Further, as shown in FIGS. 24–26, in the front roller conveyor 36, a cover body 142 which withstands the weight of the vehicle 2 with its load may be interposed between the pair of roller conveyors.

What is claimed is:

1. A car washing machine comprising a tunnel-shaped stationary car washing machine body installed on a floor, said machine body having a front and a rear and provided with means for washing a vehicle, and a conveyer device for transporting the vehicle from the front into the car washing machine body and to the rear out of the car washing machine body, characterized in that said car washing machine body comprises therein:

a pair of side brush devices which are retractable in the transverse right-and-left directions at a right angle with respect to the direction of transport of the vehicle by the conveyer device and which wash at least lateral surfaces of the vehicle; and means for keeping a predetermined distance between each of said pair of side brush devices and the corresponding one of said lateral surfaces of the vehicle.

2. A car washing machine as set forth in claim 1 wherein said means for keeping a predetermined distance comprises:

first urging means for urging the first side brush device which is one of the pair of side brush devices toward the center of said car washing machine body, a first pusher member abutting against said first side brush device and moving the latter in the direction away from the center of said car washing machine body against the urging force of said first urging means, a first driving device for transversely moving said first pusher member, and a first detecting device for detecting that said first side brush device is spaced form said first pusher member;

second urging means for urging the second side brush device which is the other of the pair of side brush devices toward the center of said car washing machine body, a second pusher member abutting against said second side brush device and moving the latter in the direction away from the center of said car washing machine body against the urging force of said second urging means, a second driving device for transversely moving said second pusher member, and a second detecting device for detecting that said second side brush device is spaced from said second pusher member; and a control device designed such that when the lateral surfaces of the vehicle are to be washed by said side brush devices, if said first detecting device detects that the first side brush device is spaced from said first pusher member, said first driving device is controlled to move said first pusher member a predetermined distance in the direction away from the center of said car washing machine body, and if said second detecting device detects that the second side brush device is spaced from said second pusher member, said second driving device is controlled to move said second pusher member a predetermined distance in the direction away from the center of said car washing machine body.

3. A car washing machine as set forth in claim 2 wherein, when the lateral surfaces of the vehicle are being washed by the side brush devices, if it is detected that said first side brush device is spaced from the first pusher member, said control device moves said first pusher member a predetermined distance away from the center of the car washing machine body and moves said second pusher member toward the center of the car washing machine body, and if it is detected that the second side brush device is spaced from the second pusher member, said control device moves said second pusher member a predetermined distance away from the center of the car washing machine body, and if it is detected that said second side brush device is spaced from the second pusher member, said control device moves said second pusher member a predetermined distance away from the center of the car washing machine body and moves said first pusher member toward the center of the car washing machine body, and if it is detected that the first side brush device is spaced from said first pusher member, said control device moves said first pusher member a predetermined distance away from the center of the car washing machine body.

4. A car washing machine comprising a tunnel-shaped stationary car washing machine body installed on a floor, said machine body having a front and a rear and provided with means for washing a vehicle, and a conveyor device for transporting the vehicle from the front into the car washing machine body and to the rear out of the car washing machine body, characterized in that a deviation detecting device is provided to detect if any part of a vehicle on the conveyor device has deviated from the conveyor device transversely at a right angle with respect to the direction of transport of the vehicle, and a control device is provided to stop the driving of said conveyor device when said deviation detecting device detects such deviation of the vehicle.

5. A car washing machine comprising a tunnel-shaped stationary car washing machine body installed on a floor, said machine body having a front and a rear and provided with means for washing a vehicle, and a conveyor device for transporting the vehicle from the front into the car washing machine body and to the rear out of the car washing machine body, characterized in that said conveyer device is comprised of a pair of roller conveyors, and a cover body which withstands the weight of the vehicle and its load is disposed between said pair of roller conveyors to span and cover the space therebetween.

* * * * *